US011260974B2

(12) United States Patent
Hiller

(10) Patent No.: US 11,260,974 B2
(45) Date of Patent: Mar. 1, 2022

(54) AIRCRAFT AEROSOL DISPENSING METHOD, APPARATUS, AND SYSTEM

(71) Applicant: The Boeing Company, Chicago, IL (US)

(72) Inventor: Nathan D. Hiller, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/248,430

(22) Filed: Jan. 25, 2021

(65) Prior Publication Data

US 2021/0221509 A1    Jul. 22, 2021

Related U.S. Application Data

(63) Continuation-in-part of application No. 16/747,664, filed on Jan. 21, 2020, now Pat. No. 10,902,759.

(51) Int. Cl.
*B64D 1/20*  (2006.01)
*B64D 37/02* (2006.01)
*B64D 47/02* (2006.01)

(52) U.S. Cl.
CPC ............. *B64D 1/20* (2013.01); *B64D 37/02* (2013.01); *B64D 47/02* (2013.01)

(58) Field of Classification Search
CPC ............ G09F 21/16; B05B 1/20; B64D 47/02
See application file for complete search history.

(56) References Cited

U.S. PATENT DOCUMENTS

| | | | |
|---|---|---|---|
| 2,308,060 A * | 1/1943 | De Rochefort-Lucay | G09F 21/16 40/213 |
| 4,122,618 A * | 10/1978 | Gay | G09F 21/16 239/171 |
| 4,561,201 A * | 12/1985 | Sanborn | G09F 21/16 40/213 |
| 5,992,065 A * | 11/1999 | Preiser | G09F 21/16 40/212 |
| 7,077,325 B2 * | 7/2006 | Tan | G06K 7/10772 235/462.36 |
| 7,082,706 B1 | 8/2006 | Stinis et al. | |
| 7,710,643 B2 * | 5/2010 | Mitchell-Dignan | G03B 21/56 359/443 |

(Continued)

FOREIGN PATENT DOCUMENTS

| | | |
|---|---|---|
| DE | 10 2008 028067 A | 12/2009 |
| FR | 561860 A | 10/1923 |

OTHER PUBLICATIONS

NonFinal Office Action for U.S. Appl. No. 16/747,664, filed Jun. 23, 2020, (8 pages), United States Patent and Trademark Office, USA.

(Continued)

*Primary Examiner* — Gary C Hoge
(74) *Attorney, Agent, or Firm* — Alston & Bird LLP

(57) ABSTRACT

A method, system and apparatus are provided for generating and dispersing plumes of reflective aerosols. Methods include: supplying fuel to an engine of an aircraft for combustion; supplying an additive to the fuel, where the additive includes at least one of a reflective aerosol or a precursor thereof; combusting the fuel and the additive to the fuel in the engine; and generating, in the exhaust from the engine, a plume of reflective aerosol, where the reflective aerosol reflects sunlight.

20 Claims, 17 Drawing Sheets

(56) References Cited

U.S. PATENT DOCUMENTS

| | | | |
|---|---|---|---|
| 2006/0071929 A1* | 4/2006 | Stinis | G09F 21/16 345/213 |
| 2016/0267825 A1* | 9/2016 | Stewart | G09F 21/16 |
| 2020/0017236 A1* | 1/2020 | Scheidler | G09F 21/10 |

OTHER PUBLICATIONS

NonFinal Office Action for U.S. Appl. No. 16/747,701, filed Mar. 30, 2021, (13 pages), United States Patent and Trademark Office, USA.

Chien, Loring. *How Does "Dot-Matrix" Skywriting Work?*, Quora, Feb. 11, 2018, (1 page). [Retrieved from the Internet Mar. 25, 2021] <https://www.quora.com/How-does-dot-matrix-skywriting-work/answer/Loring-Chien>.

* cited by examiner

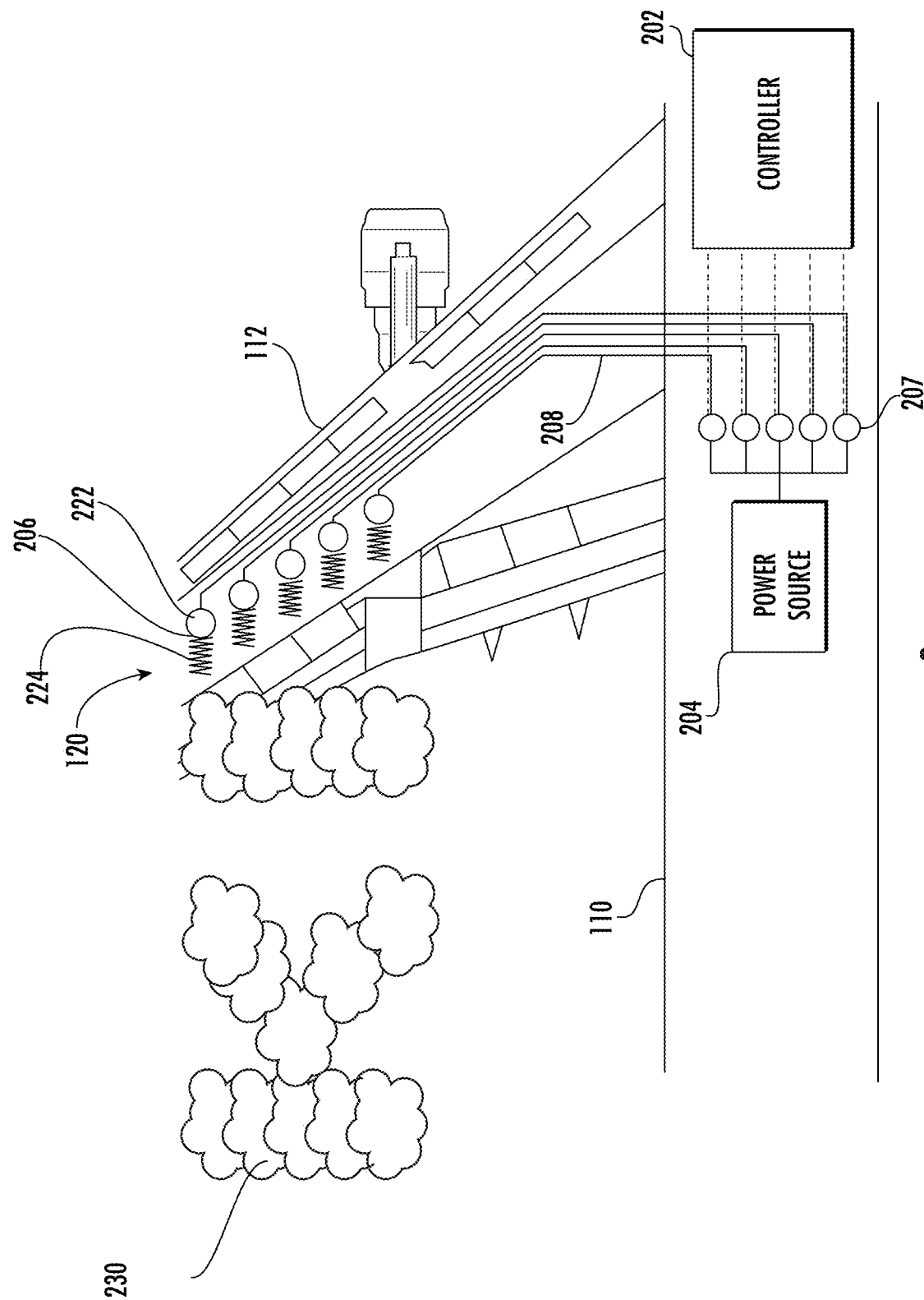

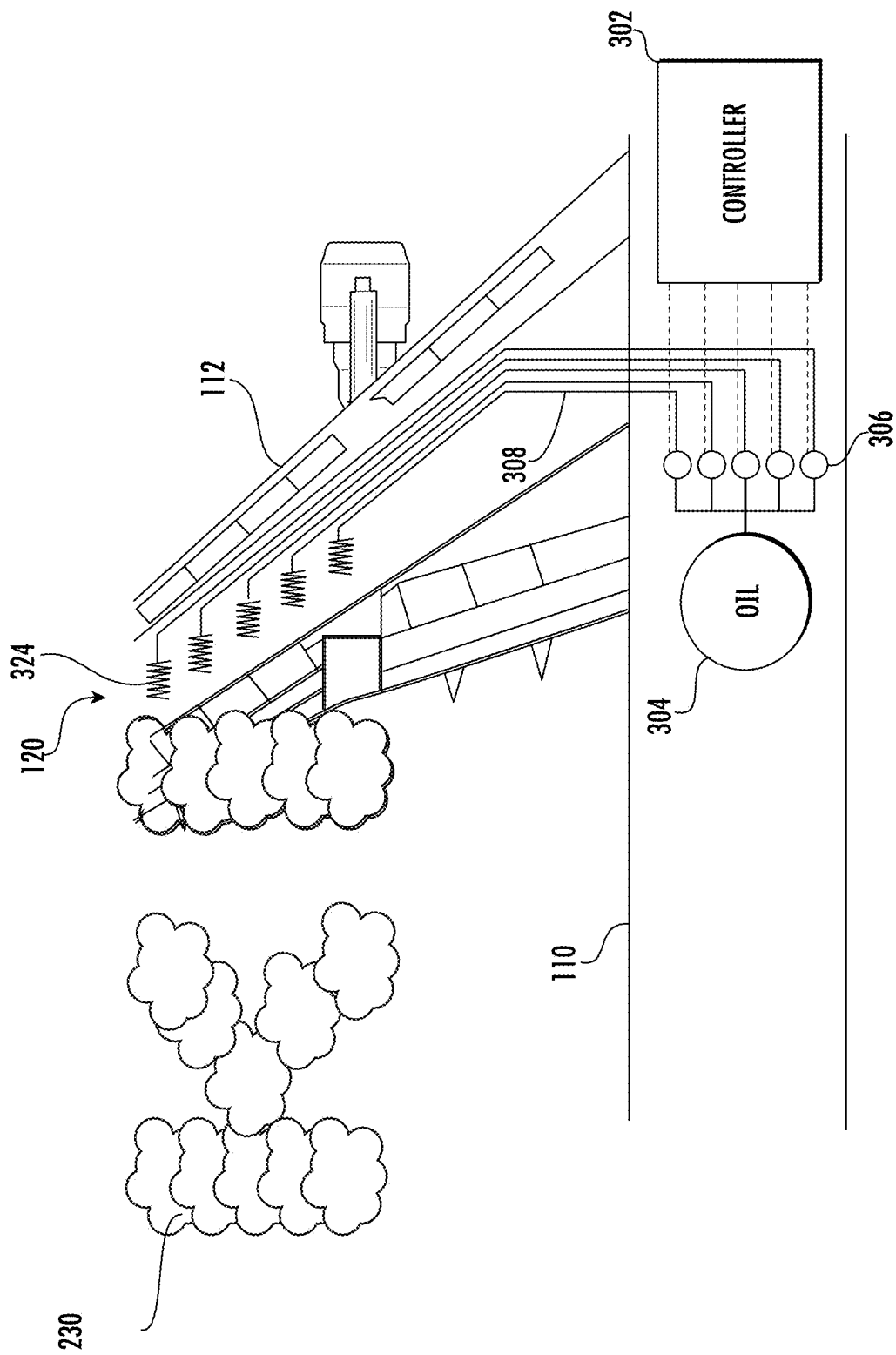

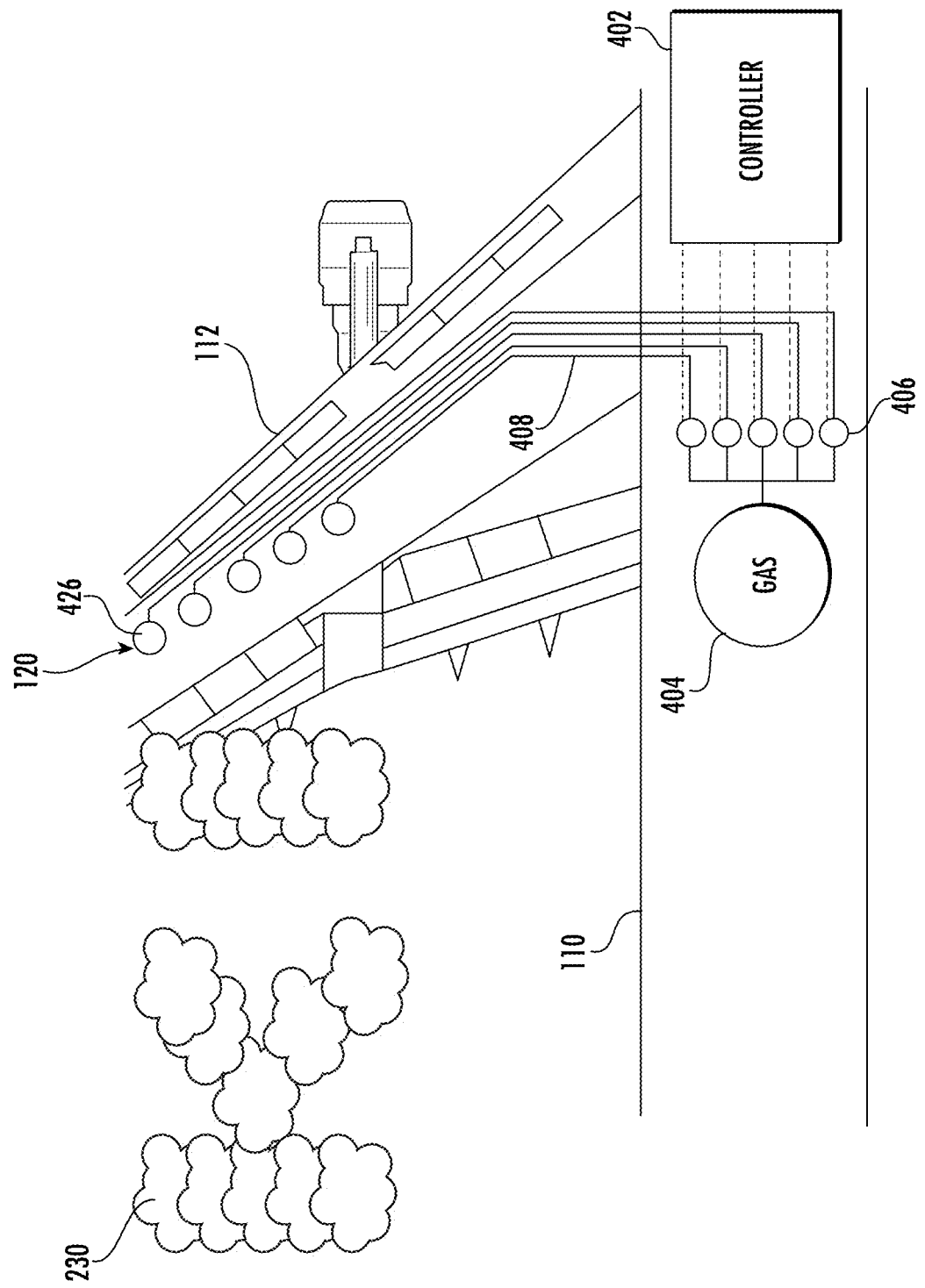

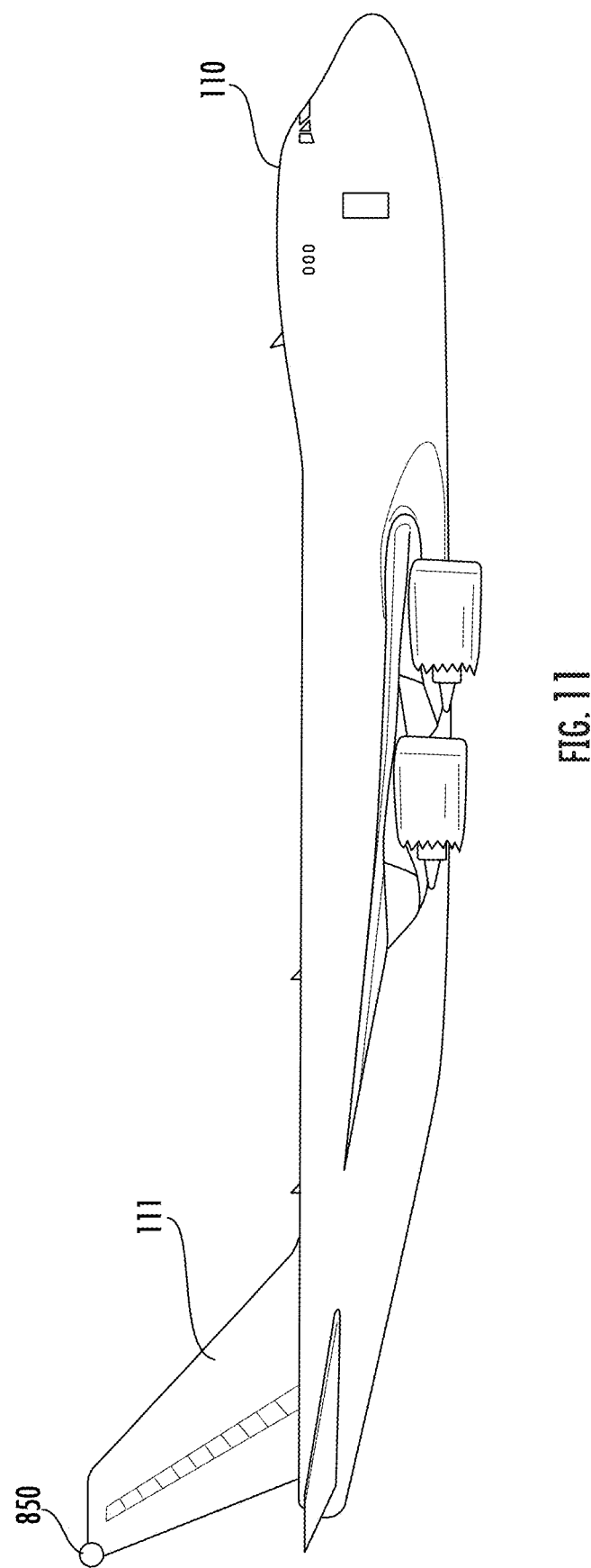

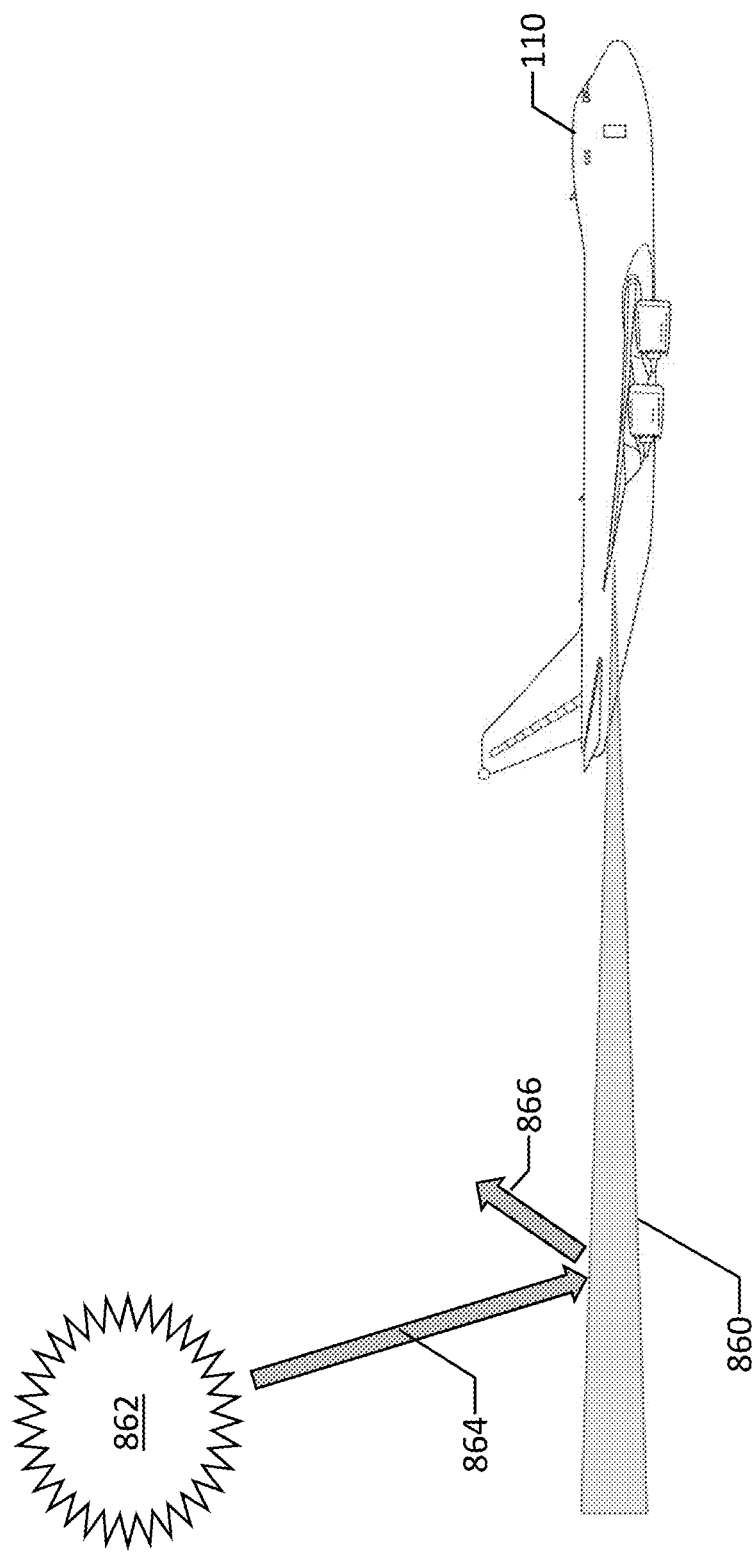

1100 — Supply fuel to an engine of an aircraft for combustion in the engine of the aircraft 1110 — Supply an additive to the fuel, where the additive is a reflective aerosol or a precursor of a reflective aerosol 1120 — Combusting the fuel and the additive to the fuel in the engine 1120 — Generate, in the exhaust from the engine, a plume of reflective aerosol, where the reflective aerosol reflects sunlight

FIG. 17

AIRCRAFT AEROSOL DISPENSING METHOD, APPARATUS, AND SYSTEM

CROSS-REFERENCE TO RELATED APPLICATIONS

This application is a continuation-in-part and claims priority to U.S. patent application Ser. No. 16/747,664, filed on Jan. 21, 2020, and issued on Jan. 26, 2021 as U.S. Pat. No. 10,902,759, the contents of which are hereby incorporated by reference in their entirety.

TECHNICAL FIELD

A method, system and computer program product are provided in accordance with example embodiments described herein to generate, from an aircraft, indicia in the sky and to produce plumes and/or cloud bursts of reflective aerosol in the sky.

BACKGROUND

Advertising has taken many forms over the years and fundamentally provides information for consumers. One form of advertising that has long been used is the placement of signs to provide information to people relating to any manner of things. Signs in the form of billboards, store-front signs, street signs, and the like form static advertising methods. Other advertising methods may be more dynamic in nature, such as digital billboards, projected signs on a billboard or building wall, banner-carrying aircraft such as planes or blimps, and sky writing.

Skywriting has conventionally been a way to reach a large number of people with a temporary medium involving a relatively low cost for the medium itself while incurring much more substantial cost in deploying the medium in the sky. Skywriting is most frequently found over areas of large populations, and more particularly, at times when the population has an increased likelihood of seeing the skywriting. For example, sporting events in outdoor venues such as football stadiums hosting an audience may be a good candidate for a skywriting due to the audience being relatively stationary and having a view of the sky. Skywriting may also be performed over cities or towns in an effort to communicate with a large number of people. However, skywriting is labor-intensive and/or generally limited in the message that can be conveyed to an audience due to the temporary nature of the medium.

Conventional skywriting is generally inefficient and relatively expensive as a form of advertising or otherwise conveying information to a viewer. Aircraft to deploy skywriting are expensive to purchase as is the operating cost of such aircraft, particularly when factoring in trained pilots and maintenance. Skywriting with a single aircraft producing a trail of vapor or smoke requires numerous passes over an area to "write" messages in the sky as the aircraft take long, sweeping paths to deploy the vapor or smoke periodically. Skywriting with multiple aircraft can employ a fleet to generate a message using smoke or vapor in as little as a single pass. However, employing multiple aircraft substantially increases the cost and requires more precise flying and timing to produce a readable message. Beyond these inherent inefficiencies, skywriting generally relies upon appropriate weather conditions such that aircraft specifically configured for skywriting may be grounded in all but appropriate conditions, thereby reducing the efficiency and increasing the inherent cost of skywriting. There is, therefore, a desire to resolve these inefficiencies.

BRIEF SUMMARY

A method, apparatus, and system are provided for generating, from an aircraft, indicia in the sky, and more particularly, for generating indicia in the sky using a single pass of the aircraft. Embodiments provided herein include a system for communicating a message from an aircraft including: a plurality of valves; a tank in fluid communication with each of the plurality of valves; a plurality of nozzles, where each nozzle is associated with a corresponding valve, and where the plurality of nozzles are distributed along a span of a wing of the aircraft; a controller configured to control each of the plurality of valves, where the controller is configured to actuate the plurality of valves to generate, from contents of the tank received at each nozzle, a plume to be suspended in air to form a plurality of plumes; and a light source configured to project indicia on the plurality of plumes. The tank of some embodiments includes water and the plume from each nozzle includes a water vapor plume. In an embodiment, the plume from each nozzle includes a frozen water vapor plume including ice crystals, where the light source projects indicia on the plurality of plumes by producing a wavelength of light absorbed by the ice crystals to melt selected areas of ice crystals of the plurality of plumes to form indicia from voids in the plurality of plumes.

According to an example embodiment, the tank contains oil, where each nozzle is associated with a heater, and where the plume from each nozzle is a plume of smoke generated by the oil passing through the heater associated with the respective nozzle. The light source of an embodiment is attached to the aircraft and disposed at a different elevation with respect to the wing of the aircraft. The light source of an embodiment includes a laser configured to project indicia from a raised elevation with respect to the wing of the aircraft on the plurality of plumes. In an embodiment, the laser configured to project indicia includes a laser configured to write indicia on the plurality of plumes with a refresh rate faster than a human eye can detect. The indicia can include at least one of text, figures, symbols, or an image projected onto the plurality of plumes.

According to an example embodiment, the plurality of nozzles are distributed along a span of two wings of the aircraft and are spaced such that the plurality of plumes generated from the plurality of nozzles combine for a width approximately as wide as a wingspan of the two wings of the aircraft. The light source of an embodiment is disposed on an arm extending from the aircraft to a position above or below the aircraft, where the light source is disposed at a position either above or below the aircraft. The arm of an embodiment is movable between a stowed position proximate the aircraft and a deployed position in which the light source is disposed at a different elevation from that of the plurality of plumes. The controller of an embodiment is configured to control movement of the arm between the stowed position and the deployed position. The light source of an embodiment projects indicia on the plurality of plumes where the indicia is dynamic indicia on the plurality of plumes.

According to an embodiment, a method is provided for displaying a message from an aircraft. Methods of an embodiment include: providing a fluid or gas to each of a plurality of valves; controlling each of the valves with a controller to produce a plume from a plurality of nozzles, where each nozzle is associated with a respective valve, and where the plurality of nozzles are distributed along a span of a wing of the aircraft; and causing indicia to be displayed on the plurality of plumes from the plurality of nozzles. The fluid or gas of an embodiment is water, and the plume includes water vapor. Causing indicia to be displayed on the plurality of plumes for an embodiment includes projecting light from a source incident on the plurality of plumes. The light from the light source of an embodiment causes at least one of text or images to appear on the plurality of plumes. Projecting light from a light source incident on the plurality of plumes includes projecting light from a light source having a different elevation with respect to an elevation of the plurality of plumes. The light source of an embodiment is attached to the aircraft by an arm and the light source is suspended at an end of the arm at a position above or below the aircraft.

Embodiments provided herein include an apparatus for communicating a message from an aircraft including at least one processor and at least one non-transitory memory including computer program code instructions. The computer program code instructions of an embodiment, when executed, cause the apparatus to at least: receive an indication of a message to be conveyed from an aircraft; actuate at least one of a plurality of valves to emit from a respective at least one nozzle a plume to be suspended in air, where a plurality of nozzles, each corresponding to a respective valve and including the respective at least one nozzle, are distributed along a span of a wing of the aircraft; and cause a light source to produce on the at least one plume the message to be conveyed.

According to an embodiment, causing the apparatus to cause a light source to illuminate at least a portion of the at least one plume includes causing the light source to project light from the light source onto the at least one plume to display at least one of text or an image as the messages to be conveyed. Causing the apparatus to receive an indication of a message to be conveyed from an aircraft of some embodiments includes causing the apparatus to receive instructions for a time, location, and message to be conveyed at the instructed time and location. Each of the plurality of valves of an example embodiment is supplied with a fluid and the fluid is vaporized through the plurality of nozzles in response to actuation of the plurality of valves.

Embodiments provided herein include a system for communicating a message from an aircraft including: a plurality of valves; a plurality of nozzles, where each nozzle is associated with a corresponding valve, and where the plurality of nozzles are distributed along a span of a wing of the aircraft; at least one tank in fluid communication with the plurality of valves; and a controller configured to individually control each of the plurality of valves, where the controller is configured to individually actuate the plurality of valves to generate, from contents of the tank received at each nozzle, cloud bursts to be suspended in the air. According to an embodiment, the controller configured to individually actuate the plurality of valves to generate, from the contents of the tank received at each nozzle, cloud bursts to be suspended in the air, comprises individually actuating the plurality of valves to generate sequences of cloud bursts from each of the plurality of vales, where the sequences of cloud bursts from the plurality of valves cooperate to form indicia suspended in air.

According to an embodiment, the controller configured to individually actuate the plurality of valves to generate sequences of cloud bursts from each of the plurality of valves, where the sequences of cloud bursts from the plurality of valves cooperate to form indicia suspended in the air is configured to individually actuate the plurality of valves with timing based, at least in part, on a speed of the aircraft. The indicia of an embodiment includes a message of at least one of text, figures, symbols, or images suspended in the air. The at least one tank contains water in some embodiments, and the cloud bursts include water vapor cloud bursts. The at least one tank may contain oil in some embodiments, where each nozzle is associated with a heater, and where the cloud bursts from each nozzle are cloud bursts of smoke generated by the oil passing through the heater associated with the respective nozzle.

The at least one tank of some embodiments includes a plurality of tanks distributed along the span of the wing of the aircraft, where each tank is associated with and in fluid communication with at least one valve. The plurality of nozzles of an embodiment are displaced relative to one another along the span of the wing of the aircraft in a direction of travel of the aircraft, and the controller is configured to introduce a sequential delay of actuation of the nozzles from a foremost nozzle to a rearmost nozzle to produce a cloud burst line substantially perpendicular to the direction of travel of the aircraft. The sequential delay of actuation of the nozzles includes a time delay between adjacent nozzles, where the time delay between adjacent nozzles is dependent upon a speed of the aircraft, where the speed of the aircraft is between about 175 miles per hour and 230 miles per hour, and the time delay between adjacent nozzles is about three to four milliseconds.

According to an example embodiment, the plurality of nozzles are distributed along a span of the two wings of the aircraft and are spaced such that the cloud bursts generated from the plurality of nozzles combine for a width approximately as wide as a wingspan of the two wings of the aircraft. The controller is configured to individually actuate the plurality of valves to generate, from the contents of the tank received at each nozzle, cloud bursts to be suspended in the air in response to receiving an instruction to provide for display of indicia in the air. The instruction of some embodiments is received from a device located remotely from the aircraft. An embodiment may include a light source associated with each of the plurality of nozzles, where the light source associated with a respective nozzle is configured to project a light to the cloud bursts generated by the respective nozzle to be scattered by the cloud bursts generated by the respective nozzle. An embodiment includes one or more dye tanks, where each nozzle is associated with at least one dye tank of the one or more dye tanks, and where cloud bursts generated by a respective nozzle are dyed by dye from the at least one dye tank of the one or more dye tanks.

According to some embodiments, a method for communicating a message from an aircraft is provided. The method of an embodiment includes: providing fluid or gas to each of a plurality of valves, each valve associated with a respective nozzle of a plurality of nozzles, where the plurality of nozzles are distributed along a span of a wing of the aircraft; and individually controlling each of the valves of the plurality of valves with a controller to produce one or more cloud bursts from a respective nozzle, where the one or more cloud bursts are produced to cooperate to form indicia suspended in an atmosphere trailing the aircraft as the aircraft advances through the atmosphere. The fluid of an embodiment is water and the cloud bursts include water vapor. The indicia suspended in the air is in the form of at least one of text, figures, symbols, or an image. The plurality of nozzles of an embodiment are displaced relative to one another along the span of the wing of the aircraft in a direction of travel of the aircraft, and the controller is configured to introduce a sequential delay of actuation of the nozzles from a foremost nozzle to a rearmost nozzle to produce a cloud burst line substantially perpendicular to the direction of travel of the aircraft. According to an embodiment, individually controlling each of the valves of the plurality of valves with a controller to produce one or more cloud bursts from a respective nozzle is performed based, at least in part, on a speed of the aircraft.

Embodiments provided herein may include an apparatus for communicating a message from an aircraft including at least one processor and at least one non-transitory memory including computer program code instructions. The computer program code instructions are configured to, when executed, cause the apparatus to at least: receive an indication of a message to be conveyed from an aircraft, where the aircraft includes a plurality of valves each in communication with a respective nozzle of a plurality of nozzles, where the plurality of nozzles are distributed along a span of a wing of the aircraft; and individually actuate at least some of the plurality of valves to emit from the corresponding at least some of the plurality of nozzles cloud bursts to be suspended in air, where the cloud bursts to be suspended in the air cooperate to form indicia suspended in the air conveying the message.

According to some embodiments, causing the apparatus to receive an indication of a message to be conveyed from an aircraft includes causing the apparatus to receive instructions for a time, location, and message to be conveyed at the instructed time and location. Each of the plurality of valves of some embodiments is supplied with a fluid, where the fluid is vaporized through the plurality of nozzles in response to actuation of the plurality of valves. According to an embodiment, causing the apparatus to individually actuate at least some of the plurality of valves to emit from the corresponding at least some of the plurality of nozzles cloud bursts to be suspended in the air includes causing the apparatus to impart a delay between valves controlling nozzles based on their position along the span of the wing of the aircraft.

Embodiments provided herein include a system including: a plurality of valves within an aircraft; at least one tank in fluid communication with the plurality of valves and containing at least one of a reflective aerosol or a precursor of a reflective aerosol; a plurality of nozzles, where each nozzle is associated with a corresponding valve, and where the plurality of nozzles are distributed along a span of a wing of the aircraft; and a controller configured to control each of the plurality of valves, where the controller is configured to actuate the plurality of valves to generate, from the at least one of the reflective aerosol or the precursor of the reflective aerosol received at each nozzle, a cloud burst or plume to be suspended in the air to form a plurality of cloud bursts or plumes of reflective aerosol that reflects sunlight. The controller of an example embodiment is further configured to determine if the location of the aircraft corresponds to a location where reflective aerosol deployment is appropriate and actuate the plurality of valves in response to the location of the aircraft corresponding to a location where reflective aerosol deployment is appropriate. The at least one tank, in some embodiments, is a tank held in a fuselage of the aircraft, where each of the plurality of valves are in fluid communication with the tank and the at least one reflective aerosol or the precursor of the reflective aerosol are provided from the tank to the plurality of valves. The at least one tank, in some embodiments, is a plurality of tanks held in the wing of the aircraft, where each of the plurality of valves are in fluid communication with a respective tank of the plurality of tanks and the at least one reflective aerosol or the precursor of the aerosol are provided from the plurality of tanks to the plurality of valves.

An example embodiment of the system includes a fuel system for supplying fuel to an engine of the aircraft, where the at least one tank is in fluid communication with the fuel system, where the controller is further configured to meter the at least one of the reflective aerosol or the precursor of the reflective aerosol into the fuel system to mix with the fuel supplied to the engine, where exhaust from the engine from combustion of the fuel mixed with the at least one of the reflective aerosol or the precursor of the reflective aerosol produces a plume of reflective aerosol, where the reflective aerosol reflects sunlight. In response to the formation of the cloud bursts or the plumes from the plurality of nozzles and the exhaust from the engine from the engine of the plume of reflective aerosol, a blanket is formed of reflective aerosol that reflects sunlight.

Embodiments provided herein include a method including: supplying fuel to an engine of an aircraft for combustion in the engine of the aircraft; supplying an additive to the fuel, where the additive includes at least one of a reflective aerosol or a precursor of a reflective aerosol; combusting the fuel and the additive to the fuel in the engine; and generating, in the exhaust from the engine, a plume of reflective aerosol, where the reflective aerosol reflects sunlight. In some embodiments, supplying the additive to the fuel includes supplying the additive to the fuel from a tank, where the tank includes the at least one of the reflective aerosol or a precursor of the reflective aerosol. Supplying the additive to the fuel includes, in some embodiments, premixing the additive to the fuel before the fuel reaches the engine of the aircraft.

Embodiments provided herein include a system for communicating a message from an aircraft including: a plurality of valves; at least one tank in fluid communication with each of the plurality of valves, where contents of the tank include at least one of a reflective aerosol or a precursor of a reflective aerosol; a plurality of nozzles, where each nozzle is associated with a corresponding valve, and where the plurality of nozzles are distributed along a span of a wing of the aircraft; a controller configured to control each of the plurality of valves where the controller is configured to actuate the plurality of valves to generate, from the contents of the tank received at each nozzle, a plume of reflective aerosol to be suspended in the air to form a plurality of plumes; and a light source configured to project indicia on the plurality of plumes of reflective aerosol. The light source is attached to the aircraft and disposed at a different elevation with respect to the wing of the aircraft according to some embodiments. According to an example embodiment, the controller is configured to control a degree of transparency of the plume of reflective aerosol suspended in the air. The controller of an example embodiment is configured to increase a proportion of light reflected from the plume of reflective aerosol based on at least one of a volume or a density of reflective aerosol dispersed.

The light source of some embodiments includes a laser configured to project indicia from a raised elevation with respect to the wing of the aircraft on the plurality of plumes of reflective aerosol. According to some embodiments, the laser configured to project indicia includes a laser configured to write indicia on the plurality of plumes with a refresh rate faster than a human eye can detect. According to some embodiments, the indicia includes at least one of text, figures, symbols, or an image projected onto the plurality of plumes. The plurality of nozzles of some embodiments are distributed along a span of two wings of the aircraft and are spaced such that the plurality of plumes of reflective aerosol generated from the plurality of nozzles combine for a width at least as wide as a wingspan of the two wings of the aircraft. Embodiments can include an arm extending from the aircraft to a position above or below the aircraft, where the light source is disposed on the arm at a position either above or below the aircraft. The arm, of some embodiments, is movable between a stowed position proximate the aircraft and a deployed position in which the light source is disposed at an elevation different from that of the plurality of plumes. The controller of some embodiments is configured to control movement of the arm between the stowed position and the deployed position.

BRIEF DESCRIPTION OF THE DRAWINGS

Figure 1:
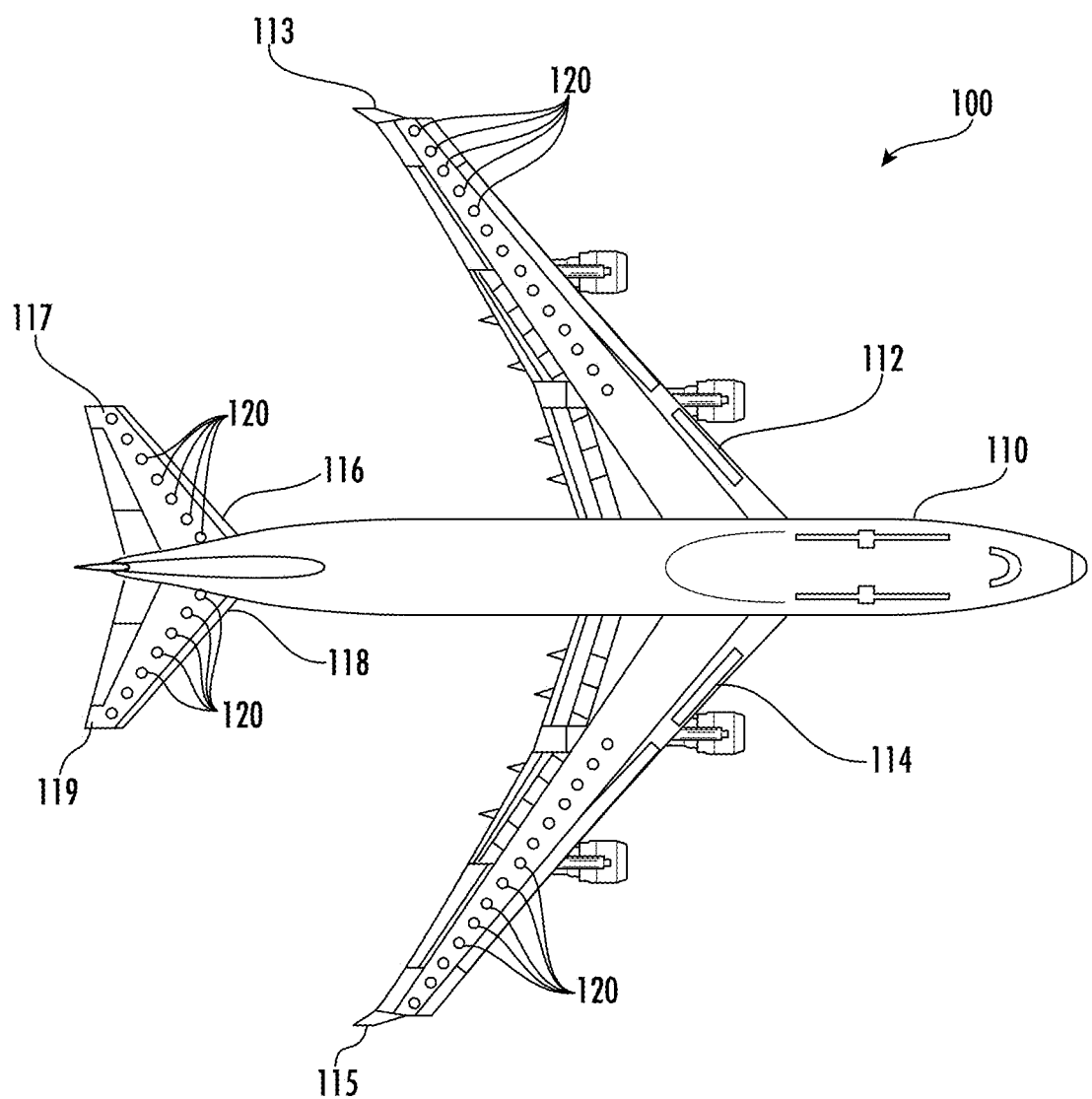
Figure 2:
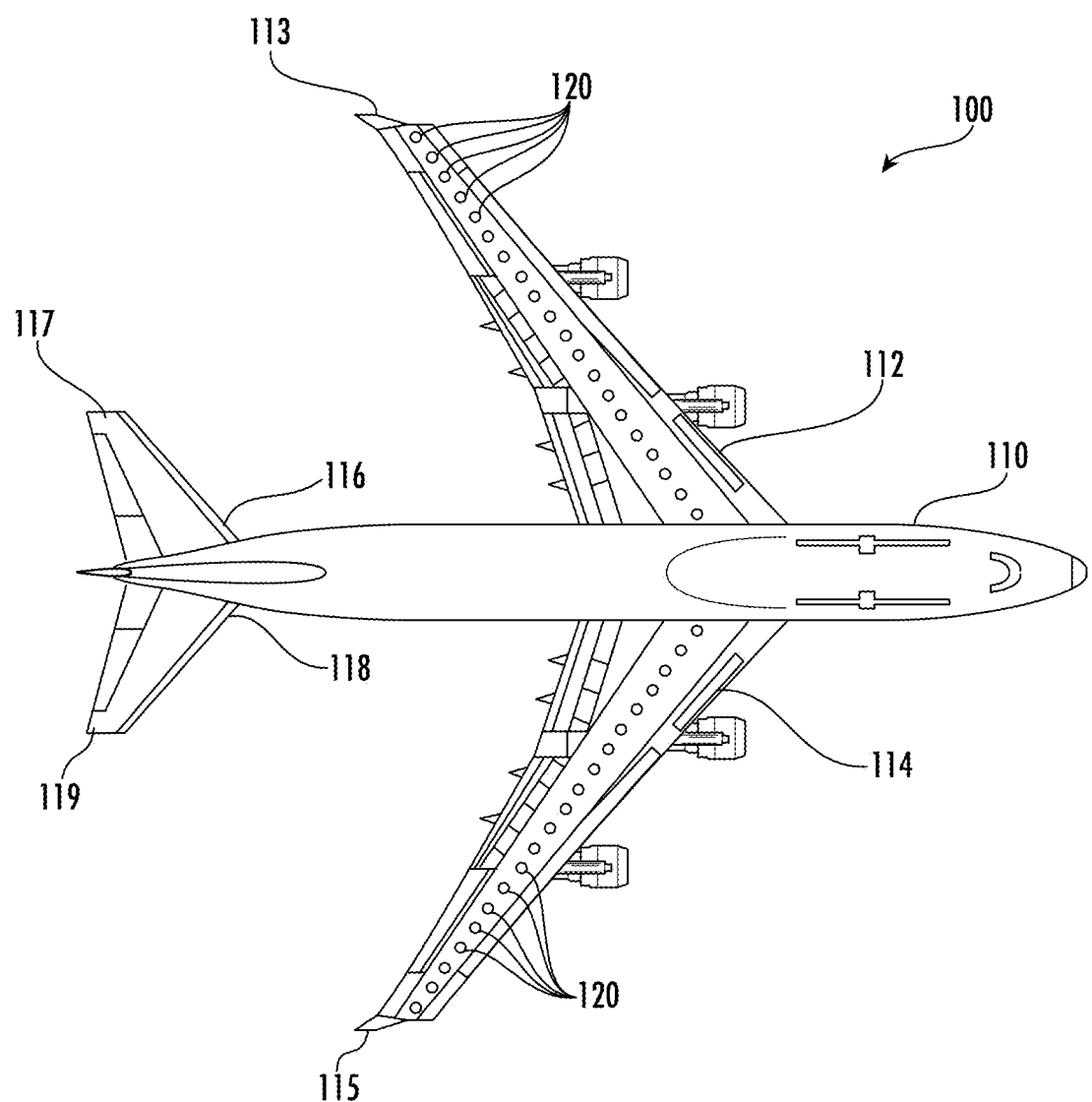
Figure 6:
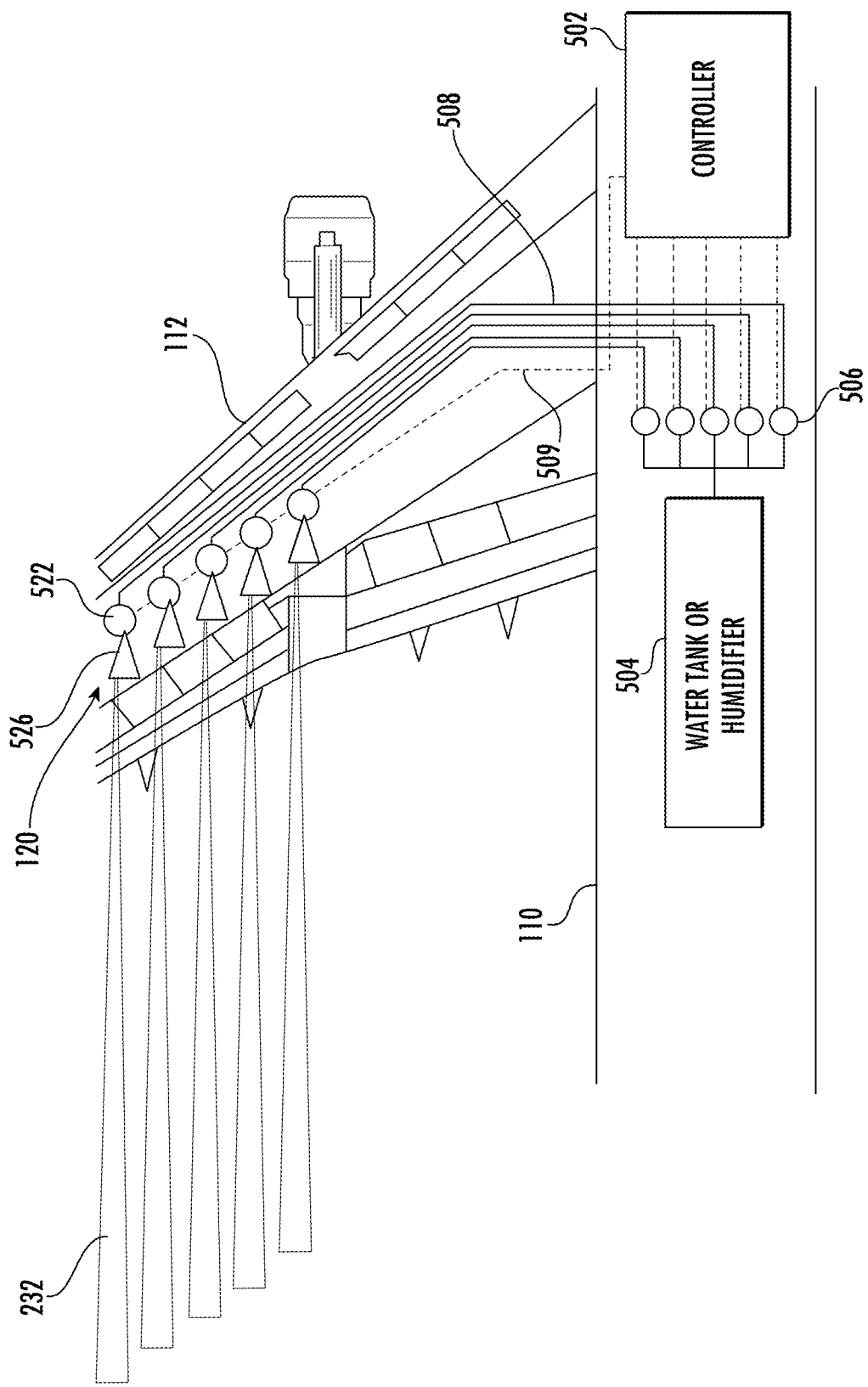
Figure 7:
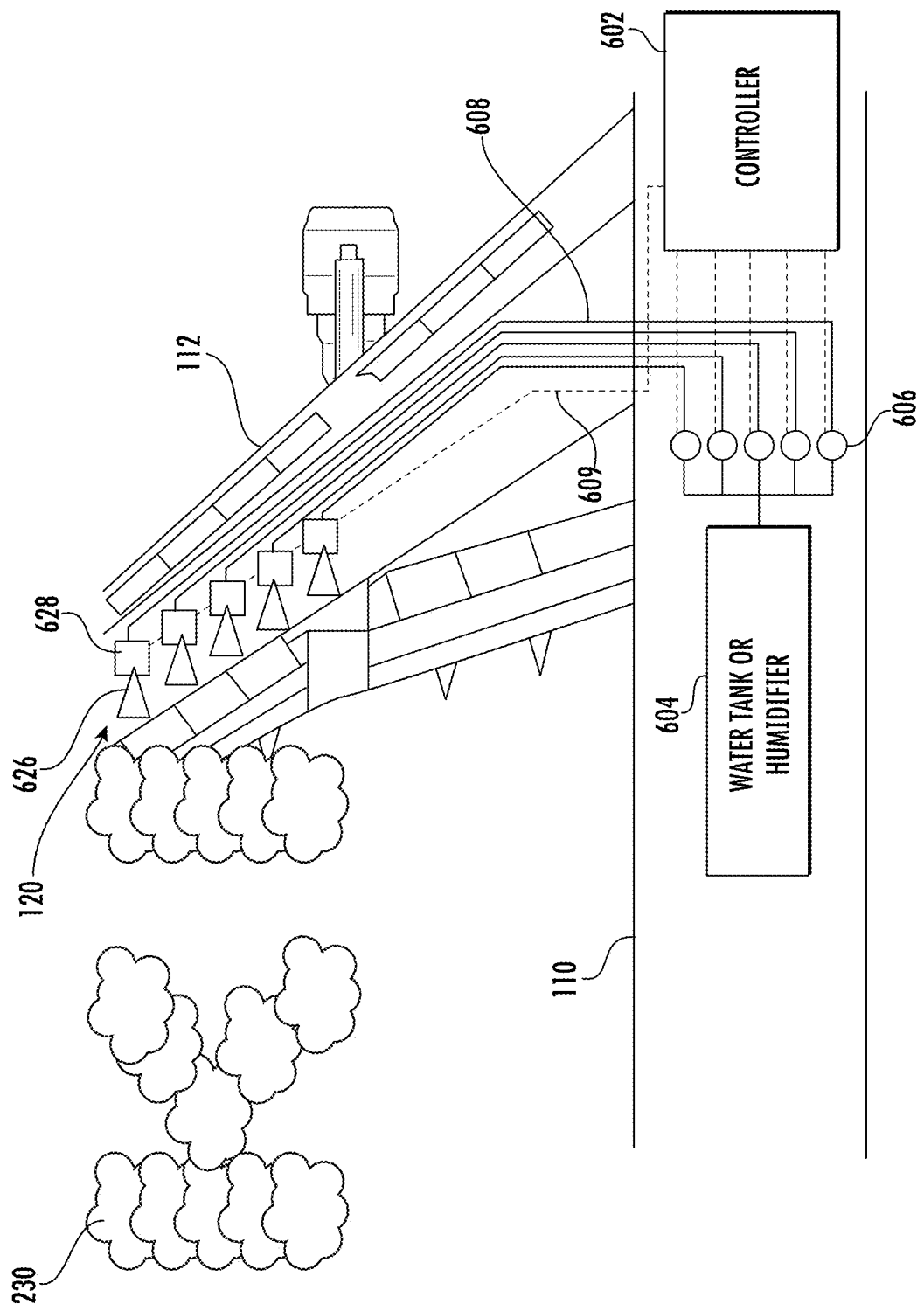
Figure 8:
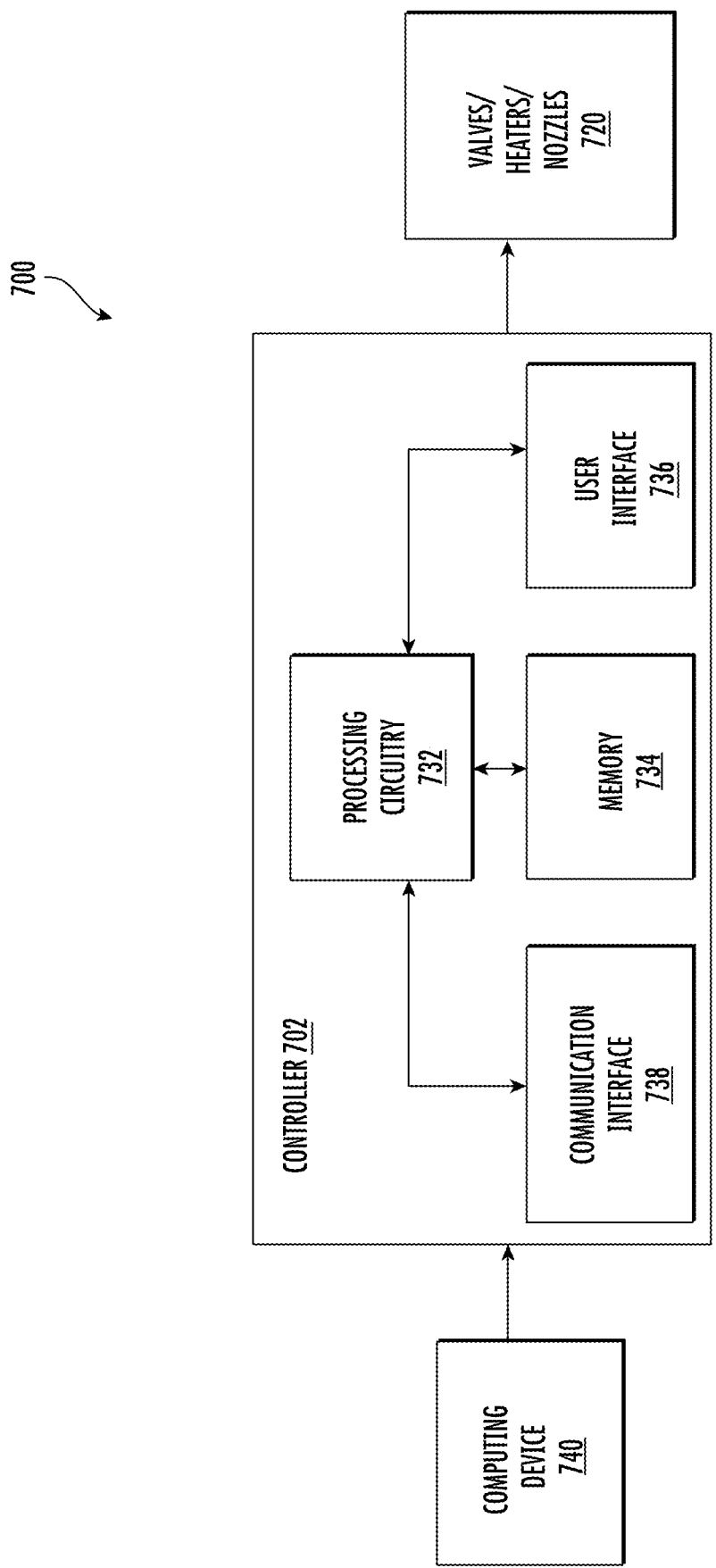
Figure 9:
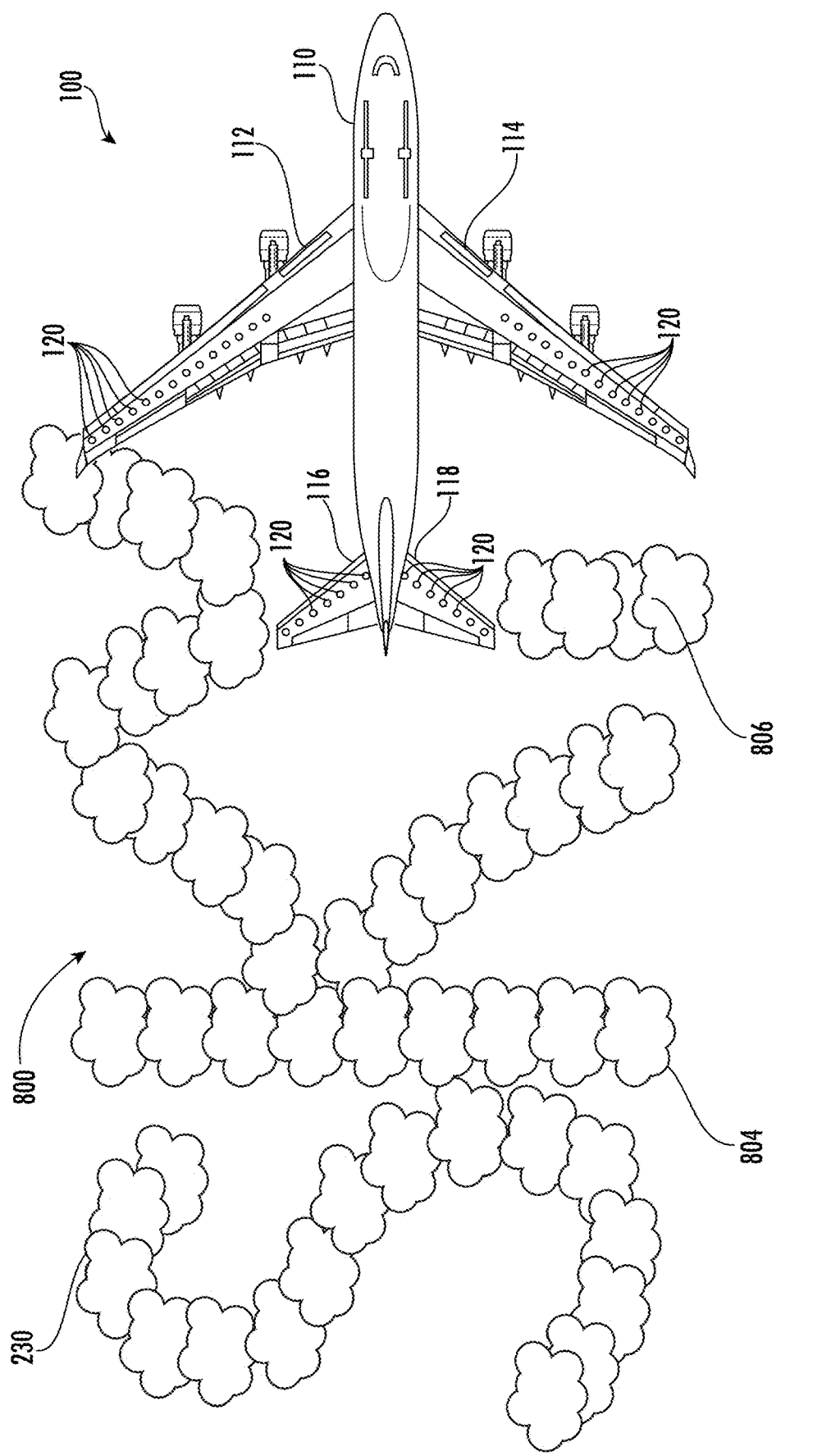
Figure 10:
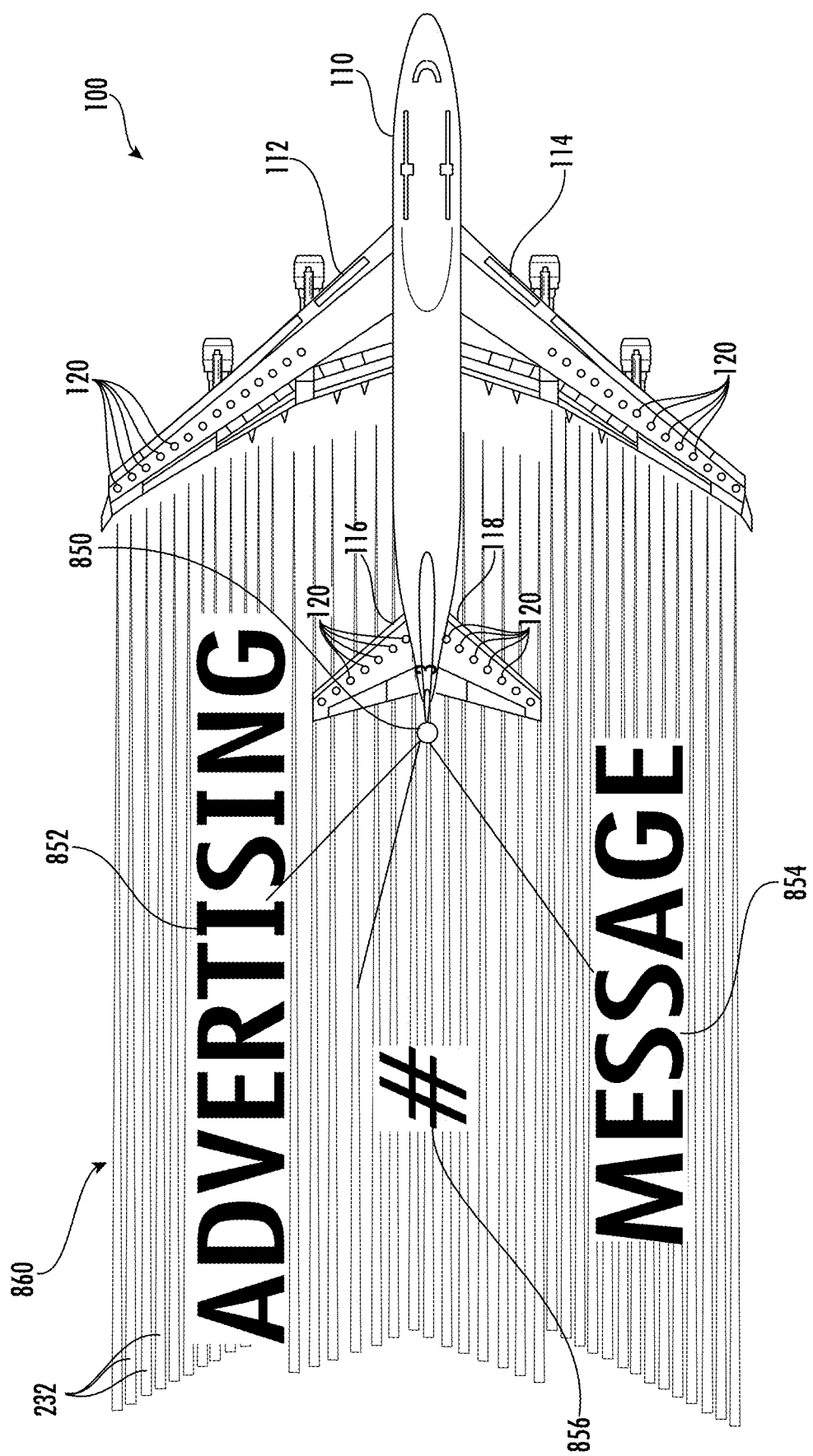
Figure 2:
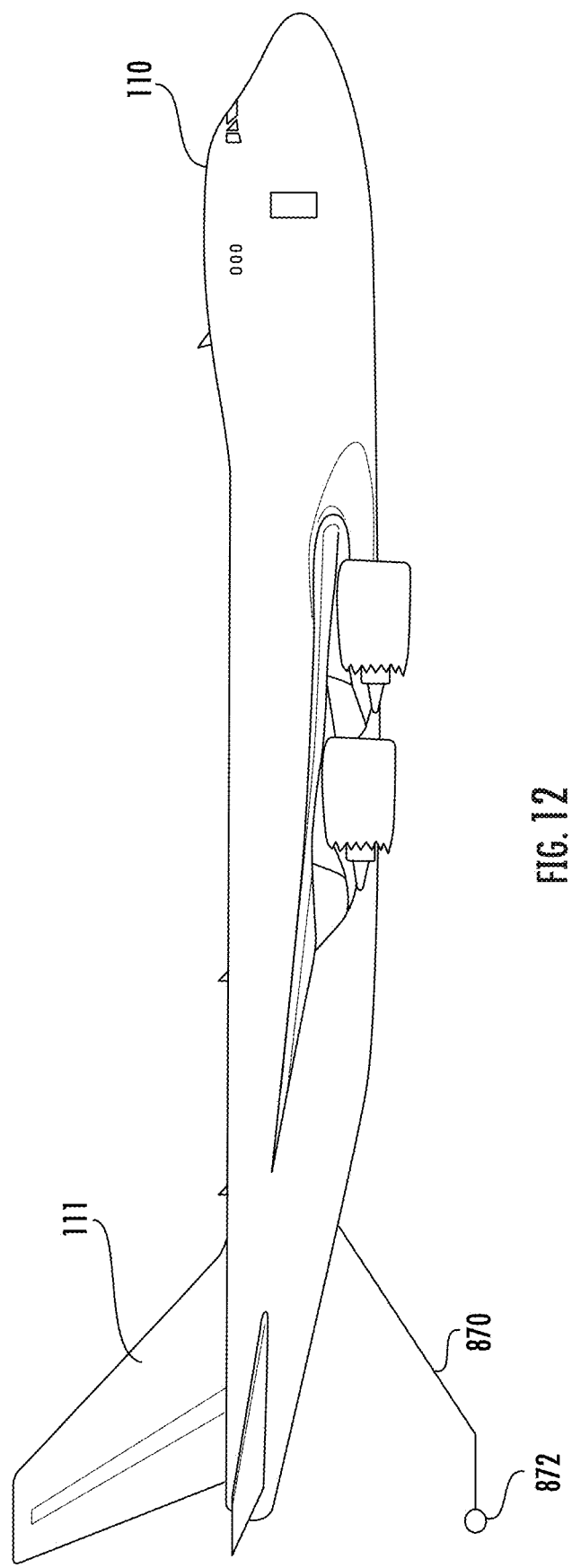
Figure 3:
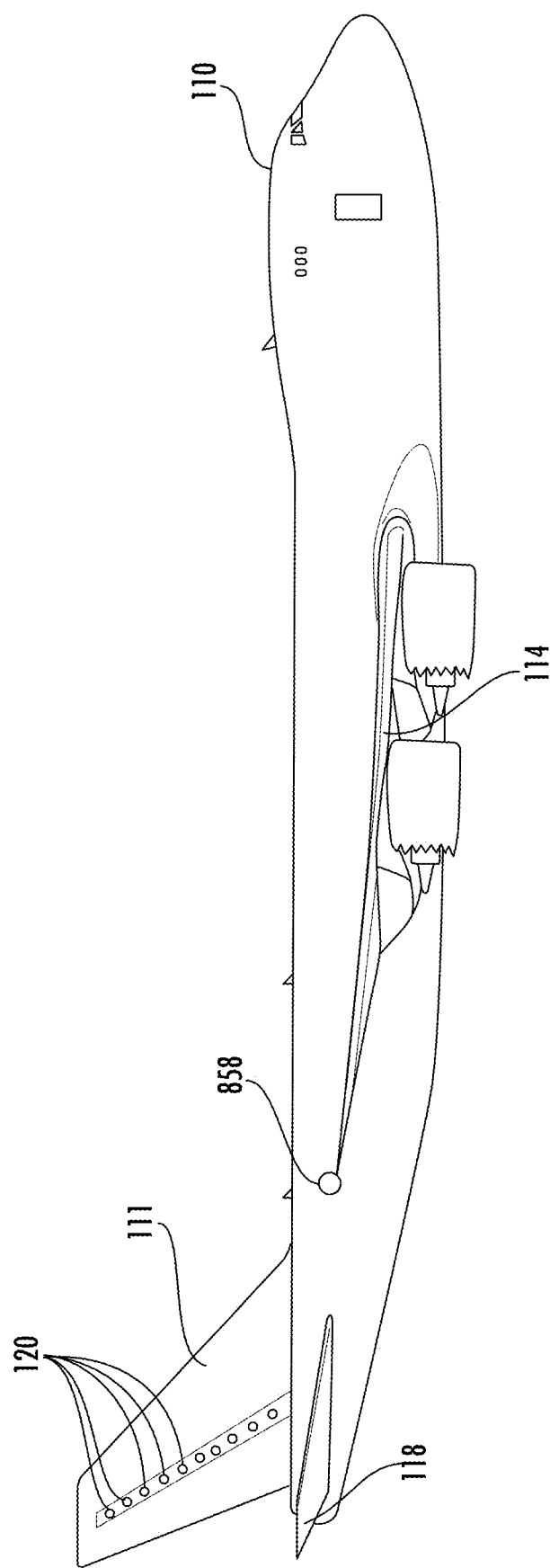
Figure 15:
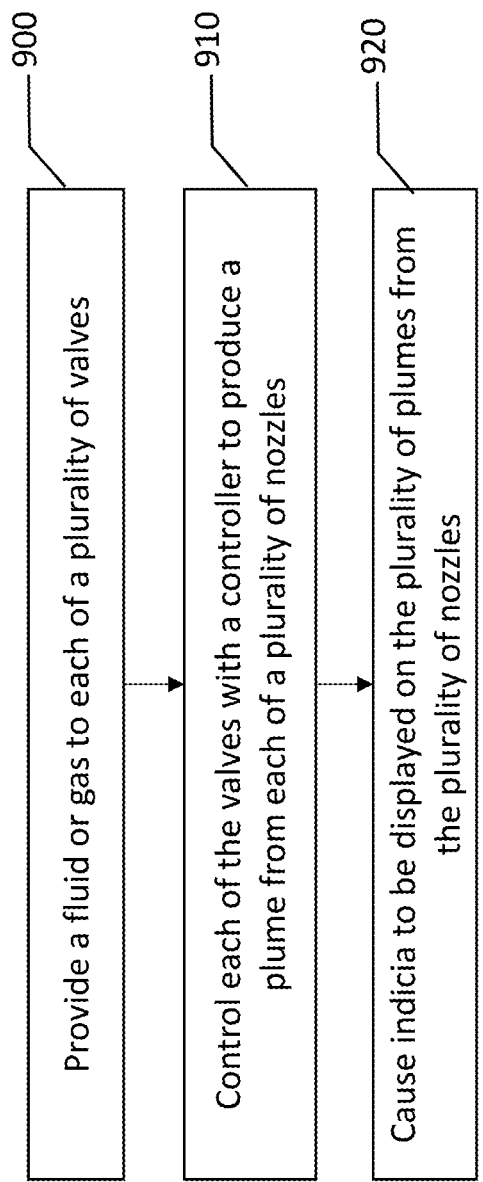
Figure 16:
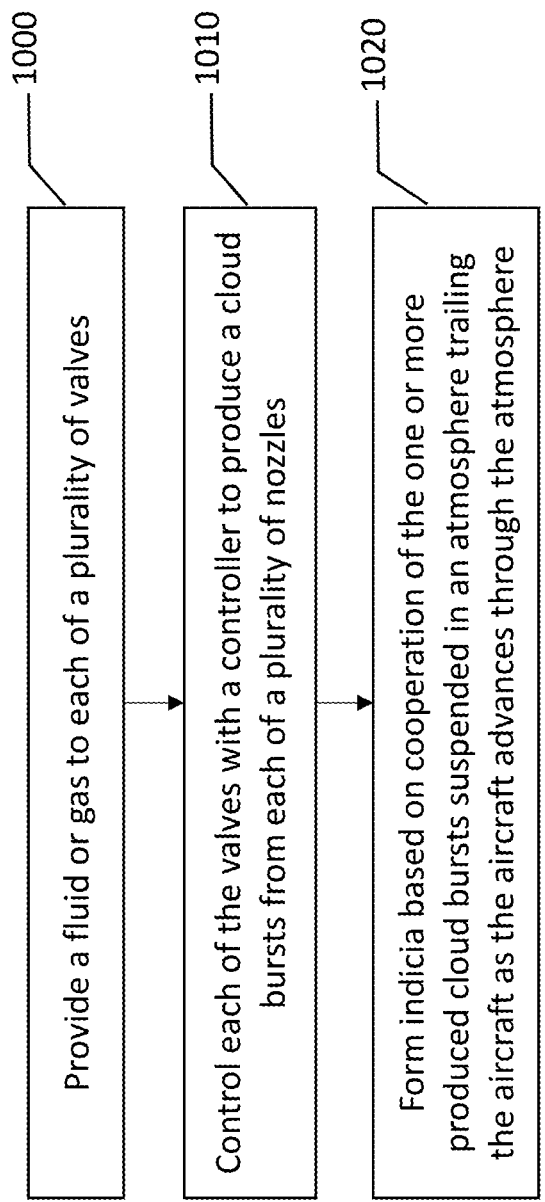

Having thus described certain example embodiments of the present disclosure in general terms, reference will hereinafter be made to the accompanying drawings which are not necessarily drawn to scale, and wherein:

FIG. 1 illustrates a system for generating indicia in the sky with a single pass of an aircraft according to an example embodiment of the present disclosure;

FIG. 2 illustrates a system for generating indicia in the sky with a single pass of an aircraft according to another example embodiment of the present disclosure;

FIG. 3 depicts a method of generating plumes and/or cloud bursts from nozzles of an aircraft according to an example embodiment of the present disclosure;

FIG. 4 depicts a method of generating plumes and/or cloud bursts from nozzles of an aircraft according to another example embodiment of the present disclosure;

FIG. 5 depicts a method of generating plumes and/or cloud bursts from nozzles of an aircraft according to yet another example embodiment of the present disclosure;

FIG. 6 depicts a method of generating plumes and/or cloud bursts from nozzles of an aircraft according to still another example embodiment of the present disclosure;

FIG. 7 depicts a method of generating plumes and/or cloud bursts from nozzles of an aircraft according to another example embodiment of the present disclosure;

FIG. 8 illustrates a system for generating indicia in the sky with a single pass of an aircraft including a controller according to an example embodiment of the present disclosure;

FIG. 9 illustrates a system generating indicia in the sky with a single pass of an aircraft according to an example embodiment of the present disclosure;

FIG. 10 illustrates a system generating indicia in the sky with a single pass of an aircraft according to another example embodiment of the present disclosure;

FIG. 11 depicts a profile view of an aircraft including a light source disposed at an elevated location for illuminating a plurality of plumes of vapor or smoke according to an example embodiment of the present disclosure;

FIG. 12 depicts the profile view of the aircraft of FIG. 11 including a light source disposed on an arm for illuminating a plurality of plumes of vapor or smoke according to an example embodiment of the present disclosure;

FIG. 13 depicts the profile view of the aircraft of FIG. 11 having nozzles disposed on the tail of the aircraft according to an example embodiment of the present disclosure;

FIG. 14 depicts plumes of reflective aerosol forming a blanket of reflective aerosol suspended in air and reflecting sunlight according to an example embodiment of the present disclosure;

FIG. 15 illustrates a flowchart of a method for generating indicia in the sky with a single pass of an aircraft according to an example embodiment of the present disclosure;

FIG. 16 illustrates a flowchart of another method for generating indicia in the sky with a single pass of an aircraft according to an example embodiment of the present disclosure; and FIG. 17 illustrates a flowchart of a method for generating plumes of reflective aerosol according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, apparatus, and system for producing indicia in the sky are provided in accordance with an example embodiment described herein to produce indicia in the sky using a single pass of an aircraft. Advertising in the form of skywriting is presently inefficient and relatively expensive as a form of advertising as it requires substantial labor and equipment to plan and conduct a special aircraft flight to produce the indicia in the sky. Further complicating matters with skywriting is that the weather typically must be appropriate for skywriting to be performed. Skywriting with cloudy skies may render a message unreadable, while skywriting under mildly windy conditions may result in a message that becomes unreadable before the message is completed. As conventional skywriting requires substantial planning to ensure resources are available while also dealing with the unpredictable nature of weather, dedicated skywriting aircraft or fleets thereof can be inefficient and may only be able to provide skywriting services on an unpredictable schedule.

Embodiments described herein employ conventional passenger aircraft to perform skywriting in a manner that is efficient and readily available for when conditions are appropriate for skywriting. Embodiments are suited to larger aircraft with greater wingspans; however, any conventional aircraft can employ the methods and systems described herein. Given the numerous number of daily flights of larger aircraft, embodiments described herein can capitalize on a resource that is already present and prevalent to generate additional revenue streams through the use of skywriting technology that will enhance existing aircraft.

Conventional skywriting requires numerous passes to "write" a message in the sky using a single line of vapor or smoke trailing an aircraft. As planes, even small nimble planes, cannot make sharp enough turns in the sky to write a message in a single continuous path, aircraft performing conventional sky writing take long sweeping paths and deploy the vapor or smoke periodically to write the message using multiple passes. Conversely, sky typing involves a fleet of planes "typing" a message in the sky using a dot-matrix style printing of smoke or vapor to the sky. This process requires a fleet of aircraft operating in unison, which is inherently inefficient and needs precise flight paths and deployment of vapor/smoke to generate the message. As noted above, skywriting typically only occurs under appropriate conditions such that employing a fleet of aircraft to perform sky typing still further reduces the efficiency of aircraft as a fleet typically must be at the ready for if and when weather conditions are appropriate for skywriting or sky typing. Embodiments provided herein do not suffer these inefficiencies as the skywriting functionality of the planes is present and used when conditions are appropriate with planes not deviating from predetermined flight plans.

While commercial aircraft often fly at 30,000 feet of altitude and above, where skywriting would not be easily visible, aircraft fly at much lower altitudes after take off as they ascend during climbing and as they descend and approach for landing. Further, these periods of climbing and approach, when the aircraft are below around 14,000 feet, typically occur near airports and airports are often situated near population centers. A 200 foot tall letter from the 200 foot wingspan of an aircraft may appear approximately the size of 12-point font at around 14,000 feet. Thus, people near the airports (e.g., within a radius of 30-50 miles) may be able to read the skywriting from aircraft during climb and approach.

FIG. 1 illustrates an example of a system 100 for skywriting according to embodiments provided herein. The illustrated system includes an aircraft 110 having wings 112, 114 and horizontal stabilizers 116, 118. The wings 112, 114 each have a span from the point at which they attach to the fuselage of the aircraft 110 to their respective tip 113, 115. The horizontal stabilizers 116, 118 similarly each have a span from where they attach to the fuselage tail of the aircraft to their respective tips 117, 119. The aircraft 110 has a wingspan which extends from the tip 113 of a first wing 112 to the tip 115 of a second wing 114. The wings of the illustrated embodiment each include a plurality of nozzles 120 distributed along a span of the respective wing. According to the illustrated embodiment, the horizontal stabilizers 116, 118 also include a plurality of nozzles 120 distributed along a span of the respective horizontal stabilizer.

The nozzle configuration of aircraft may vary. For example, the horizontal stabilizer of some embodiments may not include nozzles. In such an embodiment, the nozzles 120 of the wings 112, 114 may be distributed substantially along a full span of each wing as opposed to the illustrated embodiment of FIG. 1 in which the nozzles are not disposed closest to a fuselage of the aircraft 110 due to the presence of nozzles 120 on the horizontal stabilizers 116, 118. FIG. 2 illustrates an example embodiment in which the horizontal stabilizers 116, 118 lack nozzles 120 while the wings 112, 114 include nozzles distributed substantially along their entire span. According to some embodiments, nozzles 120 may optionally be disposed on the belly of the fuselage of the aircraft 110 to minimize any break in the pattern of nozzles across the wingspan of the aircraft.

In order to perform the skywriting from the aircraft, the nozzles 120 of example embodiments produce a plume or cloud bursts in order to deposit a substance in the air to produce indicia or to produce a medium by which indicia can be displayed, as will be described further below. A plume, as described herein, is a prolonged or extended trail of smoke or vapor while a cloud burst is a brief, concise smoke or vapor spot. Plumes result from extended actuation of a nozzle to produce the extended trail of smoke or vapor, while cloud bursts result from momentary actuation of a nozzle to produce a small area of smoke or vapor. Provided herein are several mechanisms by which the plumes or cloud bursts may be produced from the nozzles. For instance, FIGS. 3-7 illustrate various example mechanisms by which plumes and/or cloud bursts are produced from nozzles 120 of aircraft 110.

FIG. 3 illustrates an example embodiment in which smoke is produced from the nozzles 120. As shown, a wing 112 extending from the fuselage of an aircraft 110 includes nozzles 120 distributed along a span of the wing or a portion thereof. The nozzles 120 include both an oil tank 222 and a heater 224 with a valve disposed between the oil tank and the heater to control flow of oil from the oil tank to the heater, where the nozzles 120 are each in electrical communication with a power source 204 via wires 208. A controller 202 is connected to a switch(es) 207 which may be any type of switch(es) capable of connecting and disconnecting the power source from a respective nozzle 120 based on a control signal from the controller 202. In response to a signal from the controller 202, a switch 207 allows power to be supplied from the power source 204 to a respective nozzle 120, and a valve 206 may also be signaled by the controller. The valve 206 releases gas to the heater 224 from the tank 222 and power from the switch 207 causes the heater 224 of the nozzle to heat oil from the oil tank 222 of the nozzle to produce a plume or cloud burst 230 of smoke from the respective nozzle 120. According to some embodiments, the switches 207 may be embodied with the power source 204 as part of a power providing circuitry, whereby each respective wire 208 may receive power as commanded by the power providing circuitry and controlled by the controller 202. Although the embodiment of FIG. 3 illustrates generating cloud bursts 230 from nozzles 120, plumes may also be generated in the embodiment of FIG. 3.

FIG. 4 illustrates another example embodiment of a mechanism by which plumes or cloud bursts 230 may be produced from nozzles of systems described herein. As shown, each nozzle 120 includes a respective heater 324, similar to the heaters 224 of FIG. 3. However, instead of an oil tank at each nozzle, the embodiment of FIG. 4 includes a central oil tank 304 within the fuselage of the aircraft 110 and conduits 308 to supply the oil from the oil tank to the nozzles 120 along the span of the wing 112. The oil flow through the conduits 308 may be controlled individually by controller 302 which controls valves 306, with each valve being associated with a respective nozzle 120. The embodiment of FIG. 4 uses fewer oil tanks, and may benefit from not encountering a scenario in which an oil tank for a particular nozzle runs out before oil tanks from other nozzles, preventing the particular nozzle from producing plumes or cloud bursts 230. Although the embodiment of FIG. 4 illustrates generating cloud bursts 230 from nozzles 120, plumes may also be generated in the embodiment of FIG. 4.

FIG. 5 illustrates another example embodiment of a mechanism for producing plumes or cloud bursts 230. As shown, gas container 404 within the aircraft 110 fuselage supplies gas via conduits 408 to gas nozzles 426 of nozzles 120 along the span of the wing 112 in response to controller 402 actuating a respective valve 406 for the gas nozzle 426. The gas may include a smoke or a chemical that reacts with air to produce a visible plume or cloud burst 230 upon exiting the gas nozzle 426. Although the embodiment of FIG. 5 illustrates generating cloud bursts 230 from nozzles 120, plumes may also be generated in the embodiment of FIG. 5.

FIG. 6 illustrates yet another embodiment of a mechanism for producing plumes 232 or cloud bursts. As shown, the aircraft 110 may incorporate a water tank or humidifier 504 that may send water or humidified air along conduits 508 through the wing 112 to a water nozzle or mist-forming nozzle 526 of nozzle 120. The flow of water or humidified air to the nozzle 120 may be controlled by valves 506 that are actuated by controller 502 to produce plumes 232 or cloud bursts from the respective nozzles 120. Optionally, the nozzles 120 may include dye containers or dye tanks 522 to supply dye to the mist-forming nozzle 526 to provide color to the vapor emitted from the nozzle 120. Vapor may be emitted from the nozzle 120 in a plume 232 or cloud bursts with or without dye as the dye tanks 522 may be individually addressable by the controller 502, such as by electrical connection 509, to supply dye to the nozzle 120 only when commanded by the controller 502. As will be appreciated, additional dye tanks may be used with each nozzle to provide different color options from each nozzle enabling the formation of color images or indicia when skywriting using the example embodiment of FIG. 6. Although the embodiment of FIG. 6 illustrates generating plumes 232 from nozzles 120, cloud bursts may also be generated in the embodiment of FIG. 6.

FIG. 7 depicts another example embodiment of a mechanism for producing plumes or cloud bursts 230 for skywriting. The embodiment of FIG. 7 is similar to that of FIG. 6 incorporating a water tank or humidifier 604 to supply water or humidified air via conduits 608 along the wing 112 to a respective water nozzle or misting nozzle 626. The supply to the nozzle 120 from the water tank or humidifier 604 may be controlled by valves 606 actuated by controller 602. While the embodiment of FIG. 6 includes dye tanks 522, the embodiment of FIG. 7 includes a light source 628 coupled with each water nozzle or misting nozzle 626. The light source 628 may be a laser diode or another light source which may project light into the plume or cloud bursts generated from the water nozzle or misting nozzles 626. The projected light illuminates the plume or cloud burst as the plume or cloud bursts 230 scatter the light. The light source 628 may be monochromatic or polychromatic allowing the color with which the plume or cloud bursts are illuminated to be changed. The light sources 628 may be individually addressable by controller 602 such as by an electrical signal via wire 609. According to some embodiments, a light source may be disposed proximate the fuselage of the aircraft 110 and provide light to the nozzles 120 via fiber optics to provide a similar effect as described above. Although the embodiment of FIG. 7 illustrates generating cloud bursts 230 from nozzles 120, plumes may also be generated in the embodiment of FIG. 7.

Referring now to FIG. 8, a system 700 is provided to generate, from an aircraft, indicia in the sky. As shown, the system includes a controller 702, such as the controller 202, 302, 402, 502, or 602 in the preceding figures, which provides control to valves, heaters, and/or nozzles 720, such as the valves, heaters, and/or nozzles depicted in the embodiments of FIGS. 3-7.

The controller 702 may be configured in various manners and, as such, may be embodied as a circuit board, a control module, a computer, a computer workstation, a server or the like. Regardless of the manner in which the controller 702 is embodied, the controller of an example embodiment includes or is otherwise associated with processing circuitry 732, memory 734, and optionally a user interface 736 and a communication interface 738 for performing the various functions herein described. The processing circuitry 732 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 732 is configured to execute instructions stored in the memory 734 or otherwise accessible to the processing circuitry. These instructions, when executed by the processing circuitry 732, may cause the controller 702 and, in turn, the system 700 to perform one or more of the functionalities described herein. As such, the controller 702 may comprise an entity capable of performing operations according to an example embodiment of the present disclosure while configured accordingly. Thus, for example, when the processing circuitry 732 is embodied as an ASIC, FPGA or the like, the processing circuitry and, correspondingly, the controller 702 may comprise specifically configured hardware for conducting one or more operations described herein. Alternatively, as another example, when the controller 702 is embodied as an executor of instructions, such as may be stored in the memory 734 the instructions may specifically configure the processing circuitry and, in turn, the controller 702 to perform one or more algorithms and operations described herein.

The memory 734 may include, for example, volatile and/or non-volatile memory. The memory 734 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 734 may comprise any non-transitory computer readable storage medium. The memory 734 may be configured to store information, data, applications, instructions, or the like for enabling the controller 702 to carry out various functions in accordance with example embodiments of the present disclosure. For example, the memory 734 may be configured to store program instructions for execution by the processing circuitry 732.

The user interface 736 may be in communication with the processing circuitry 732 and the memory 734 to receive user input and/or to provide an audible, visual, mechanical, or other output to a user. As such, the user interface 736 may include, for example, a user interface by which an operator can manually control valves/heaters/nozzles 720, test or diagnose issues with the system 700, or manually enter indicia, images, or the like to be generated by the system for display. Other examples of the user interface 736 include a keyboard, a mouse, a joystick, a microphone and/or other input/output mechanisms.

The communication interface 738 may be in communication with the processing circuitry 732 and the memory 734 and may be configured to receive and/or transmit data. The communication interface 738 may include, for example, one or more antennas and supporting hardware and/or software for enabling communications with a wireless communication network. Additionally or alternatively, the communication interface 738 may include the circuitry for interacting with the antenna(s) to cause transmission of signals via the antenna(s) or to handle receipt of signals received via the antenna(s). In some environments, the communication interface 738 may alternatively or also support wired communication.

Computing device 740 may be embodied by any number of devices such as mobile computing devices (e.g., laptop computers, tablet computers, mobile or smart phones, etc.) or may be fixed computing devices such as a desktop computer, workstation, or the like. The computing device 740 may be configured to provide a message, image, or other indicia or instructions for a message, image, or other indicia to the controller 702 to cause the controller 702 to control the valves/heaters/nozzles 720 in such a way as to present the message, image, or other indicia by way of skywriting as described further below. According to example embodiments which include dye tanks 522, heaters 224, 324, light sources 628, or light source described further below, the controller 702 can control the respective dye tanks, heaters, or light sources in conveying the message via the could bursts or plumes. The computing device 740 may be co-located with the controller 702 or may be remote from the controller. Further, the computing device 740 may be carried on an aircraft including the controller 702, such as controllers 202, 302, 402, 502, or 602 on aircraft 110, whereby a user of the computing device 740 may be able to provide instruction to the computing device which in-turn provides the instruction to the controller 702 to cause the skywriting to occur. The computing device 740 may be remotely located elsewhere from the aircraft, such as on the ground near where indicia is to be displayed, or remotely anywhere and in communication with the controller 702 via wired or wireless networks.

The computing device 740 of some embodiments may optionally access a website or application user inter interface by which indicia can be entered or requested, and such a website or application user interface may be a merchant by which indicia can be requested to be written in the sky for a particular time and location, and payment for such skywriting can be performed via the computing device 740. As such, the computing device 740 may be a consumer device used to access an interface through which skywriting can be requested and processed and subsequently communicated to the controller 702 for display of the skywriting. The controller 702, employing processing circuitry 732 to execute computer program code instructions stored in memory 734, receives an indication of a message to be conveyed from an aircraft. This indication may be received from the user interface 736 or from a remotely located computer or website as described above. The controller 702 of example embodiments actuates at least one of a plurality of valves to emit from a respective at least one nozzle a plume to be suspended in air, where a plurality of nozzles, each corresponding to a respective valve and including the respective at least one nozzle, are distributed along a span of a wing of the aircraft. According to an embodiment, a light source illuminates at least a portion of the at least one plume to display the message to be conveyed.

The controller 702 may be configured to perform skywriting of different types, and the type of skywriting may be dictated by the available equipment on an available aircraft or may be dictated by the time of day or night for which the skywriting request is made. A first type of skywriting involves using individual actuation of a plurality of valves to generate, from a plurality of nozzles corresponding with the plurality of valves, cloud bursts to be suspended in the air. These cloud bursts may cooperate to form indicia written in the sky. The second type of skywriting described herein includes dispersing from the plurality of valves plumes of vapor or smoke to generate a "canvas" in the sky onto which indicia is projected from a light source incident on the plumes. Both of these types of skywriting will be detailed further below.

FIG. 9 illustrates an example embodiment of skywriting using systems described herein. As shown, indicia 800 is "printed" or written to the sky by the skywriting system 100 of an example embodiment using cloud bursts 230. The indicia in the illustrated embodiment includes letters written using cloud bursts 230 from the nozzles 120 of the aircraft 110. As the aircraft traverses the sky, the individually controlled valves, each associated with a nozzle 120 are sequentially actuated to generate sequences of cloud bursts to be suspended in the air. The cloud bursts cooperate to form indicia 800. The nozzles 120 print or write the indicia based on the sequential actuation of their respective valves.

The nozzles 120 are not arranged in a straight line extending across the wingspan of the aircraft 110, but rather arranged at an angle along the sweep of the wings 112, 114. Further, in the illustrated embodiment, the horizontal stabilizers 116, 118 include nozzles 120 to cover a portion of the width of the wingspan of the aircraft 110. Nozzles located close to the fuselage along the wings 112, 114 may be used as shown in FIG. 2; however, cloud bursts from nozzles close to the fuselage may be disturbed by the horizontal stabilizers 116, 118 passing through the cloud bursts. As such, the illustrated embodiment includes nozzles 120 disposed on the horizontal stabilizers 116, 118.

Due to the positioning of the nozzles 120 along the swept angle of the wings 112, 114 and on the horizontal stabilizers 116, 118, the timing of actuation of the valves to generate the cloud bursts from the nozzles can compensate for the displacement of the nozzles relative to one another. FIG. 9 illustrates letters formed of cloud bursts 230 to form indicia including letters S, K 804 and partially-formed Y 806. As an example, to form a line of cloud bursts 230 substantially across the width of the wingspan of the aircraft 110, such as the upright line of the letter "K" 804 in indicia 800 of FIG. 9 substantially perpendicular to the direction of travel of the aircraft, the valves are actuated in specific sequences. This sequence and the timing of the valves may be based, at least in part, on the speed of the aircraft 110 in the air. Based on the distribution of the nozzles 120 across the wingspan of the aircraft, the plumes 232 and/or cloud bursts 230 produced from the nozzles can combine for a width approximately as wide as a wingspan of the two wings of the aircraft. As the vapor or smoke expands upon expulsion from the respective valves, the cloud bursts 230 and/or plumes 232 may combine for a width greater than that of the wingspan such that the width is approximately that of the wingspan of the aircraft.

As noted above, embodiments described herein may be well suited for skywriting during periods of travel at lower altitudes, such as during climbing once an aircraft has taken off from an airport, and at approach when an aircraft is coming into land at an airport. The airspeed during climbing is about 175 miles per hour, and the airspeed at approach is about 230 miles per hour. At approximately 175-230 miles per hour, the time difference between actuation of valves to form cloud bursts at the nozzles 120 along the wings 112, 114 may be around three to four milliseconds due to the sweep angle of the wings, while a time delay between the aft-most nozzle 120 of the wings 112, 114 and the foremost nozzle 120 of the horizontal stabilizers 116, 118 may be around 90-160 milliseconds. The time delay between actuation of the valves for the nozzles 120 along the wings 112, 114 is dependent upon the position of the nozzles on the wings, and the geometry of the wings which may vary between aircraft types. Further, the delay between the nozzles 120 of the wings 112, 114 and the nozzles 120 of the horizontal stabilizers 116, 118 is also dependent upon the type of aircraft as the distance between the wings and the horizontal stabilizers varies between different aircraft types. Still further, the delay is also dependent upon the speed of the aircraft. Each of these factors may be inputs to the controller 702 whereby the processing circuitry 732 determines the time delay between valve actuation for generation of cloud bursts from the nozzles 120. In example embodiments, the time delay between adjacent valve actuation for cloud bursts from the nozzles 120 to produce a line substantially perpendicular to the direction of travel is 1 to 10 milliseconds depending upon the speed of the aircraft.

Using the time delay between valve actuation and the speed of the aircraft, the controller 702 causes sequential actuation (e.g., using sequential delay) of the valves to produce the cloud bursts to form indicia. The indicia, as described above, is received at the controller 702 from computing device 740, or possibly through user interface 736. In either case, the controller determines how to produce the indicia requested and causes actuation of the valves to produce the indicia.

The second type of skywriting performed by embodiments of the present disclosure uses plumes of vapor or smoke from the plurality of nozzles 120 rather than cloud bursts. The plurality of nozzles may produce a blanket of smoke or vapor trailing the aircraft. FIG. 10 illustrates such an embodiment of system 100 in which plumes 232 from the nozzles form a blanket 860 of vapor or smoke trailing the aircraft 110. This blanket 860 then becomes a canvas on which indicia can be displayed. According to an example embodiment, the aircraft 110 may carry a light source 850, which may include one or more lasers or other illumination devices. The light source 850 may project indicia onto the blanket 860 of the plurality of plumes, where the light is incident on the plurality of plumes 232. According to the illustrated embodiment, the indicia includes the words “advertising” 852 and “message” 854 along with a number sign 856. The indicia of this embodiment follows the aircraft 110 as the aircraft translates across the sky as opposed to the embodiment of FIG. 9 where the cloud bursts forming the indicia are suspended in the sky.

The light source 850 may project any type of indicia, including letters, numbers, symbols, images, etc. Further, the light source 850 may provide monochromatic light or a variety of colors to illuminate the plurality of plumes forming the blanket 860. In order to illuminate the plurality of plumes forming the blanket 860 with indicia, the light source 850 is displaced vertically relative to the horizontal blanket 860 at a raised elevation. FIG. 11 illustrates how this can be accomplished in an embodiment of system 100, such as by elevating the light source 850 to a position at the top of the tail 111 of the aircraft 110. Optionally, as shown in FIG. 12, the light source 872 may be positioned on an arm 870 that is moveable to descend from the bottom of the aircraft 110 to a deployed position as illustrated in FIG. 12, and be retracted to a stowed position proximate the fuselage of the aircraft 110 before aircraft landing to avoid damaging the arm 870 or the light source 872. The light source may include one or more lasers that may draw or write the indicia on the blanket 860 at a refresh rate that is fast enough such that the indicia appears constant. Further, the light source may write or draw indicia on the blanket 860 in such a manner that it appears dynamic, such as animated objects or scrolling text, for example, This may be accomplished by one or more lasers writing to the blanket 860 at a rapid rate that appears to a viewer as a steady display of light rather than a laser tracing an image, as the refresh rate of the laser is faster than typically detectable by the human eye.

The blanket 860 formed by the plurality of plumes from the plurality of nozzles 120 may be formed by water vapor, as described above, which may freeze at higher altitudes and/or colder temperatures to form a plume of ice crystals suspended in the air or a frozen water vapor plume. According to an example embodiment, the light source provides a beam directed to the blanket 860 having a wavelength that is absorbed by the ice crystals and melts selected areas of the ice crystals of the blanket. According to an example, the light source is a laser. Such a configuration may “write” into the blanket 860 producing voids in the blanket forming indicia. Such an embodiment may produce an inverted sky-written message where the voids in the blanket form indicia rather than cloud bursts forming the indicia. The voids forming indicia would then not trail or follow the aircraft as with the embodiment writing to the blanket with a light source, but would produce indicia that remains substantially stationary, suspended in the sky.

While embodiments described herein provide nozzles 120 on the wings 112, 114 and horizontal stabilizers 116, 118 of an aircraft 110 to capitalize on the longest width of the aircraft across the wingspan, embodiments may be implemented on a tail 111 including a plurality of nozzles 120 as shown in FIG. 13. In such an embodiment, the nozzles 120 may produce cloud bursts in the same manner as described with respect to FIG. 9. The nozzles 120 may also be configured to produce a plurality of plumes of smoke or vapor as described with respect to FIG. 10, and the plurality of plumes may be illuminated by a light source 858 disposed proximate a tip of the wing 114 or proximate a tip of the horizontal stabilizer 118.

Further, embodiments may employ apparatuses as described above to spread reflective aerosols in the wake of an aircraft as described further below. Reflective aerosols, sometimes referred to as stratospheric aerosols as they may be dispersed in the stratosphere, are aerosols that produce a dimming effect by reflecting a portion of the sun’s solar energy and preclude it from reaching the Earth. These reflective aerosols may be formed from precursor sulfide gasses such as sulfuric acid, hydrogen sulfide ($H_2S$), or sulfur dioxide ($SO_2$) to produce formations of compounds with the sulfate anion ($SO_4^{2-}$). Non-sulfide chemicals may also be used including calcite given its benefits to the ozone layer. In addition to reflective aerosols, other reflective substances may be employed. For example, natural or artificial dust or artificial structures such as optically isotropic or anisotropic nanostructures may be used. Embodiments may employ substances that have reflective properties to efficiently and effectively reflect sunlight from reaching the Earth. As these substances would be dispersed, they would not totally obscure sunlight from reaching the Earth in the region of the substances, but instead reflect a portion of the sunlight reaching the atmosphere so as to prevent that portion from reaching the ground (or water)

An embodiment of the present disclosure employs nozzles 120 (e.g., as shown in FIG. 10) to disperse reflective aerosols and/or their precursors. Precursors of reflective aerosols include compounds that are not themselves reflective aerosols, but upon atomization into the atmosphere become reflective aerosols. These reflective aerosols can efficiently and effectively reflect sunlight. The reflective aerosols dispersed by the nozzles 120 may be stored aboard the aircraft within a central tank in the fuselage of the aircraft 110 and distributed through the wings 112 and 114 to the nozzle 102. The reflective aerosols may be stored in a tank as precursors of reflective aerosols, becoming reflective aerosols upon dispersion into the atmosphere. The reflective aerosols or precursors thereof may also be distributed from a central tank to the nozzles 120 of the horizontal stabilizers 116 and 118. According to another embodiment, the reflective aerosol or a precursor thereof may be stored in the wings 112, 114 in one or more tanks to reduce the plumbing required to convey the aerosol or precursor from the fuselage to the wings. These one or more tanks may even include individual tanks such as the tanks 222 of FIG. 3 whereby a nozzle 120 is associated with each tank 222. Within examples, the reflective aerosols may be stored in tanks 304, 404, 504, and/or 604 as precursors of reflective aerosols, becoming reflective aerosols upon dispersion into the atmosphere.

In lieu of or in addition to dispersion of reflective aerosols through the nozzles 120, reflective aerosols and/or their precursors may be mixed with fuel for spreading from the exhaust of the engines. The reflective aerosols or their precursors may be maintained in one or more tanks separate from the fuel but in fluid communication with the fuel system such that they are not dispersed throughout engine operation, but instead added to the fuel at appropriate times to disperse the reflective aerosols. The fuel system may meter the reflective aerosol or the precursor of the reflective aerosol into the fuel such that the combustion of the mixture of fuel and the reflective aerosol or the precursor produces exhaust that has suspended therein the reflective aerosol. The exhaust thus forms a plume of reflective aerosol through the combustion process of the fuel with the additive. In addition to the ability of the reflective aerosols to reflect sunlight, reflective aerosols can be implemented for the projection of indicia thereon, such as dispersing reflective aerosols in plumes 232 as illustrated in FIG. 10, forming a blanket 860 of reflective aerosols. Reflective aerosols may be particularly effective in reflecting projected indicia for improved readability and resolution relative to other forms of vapors or smoke. In an example, the blanket 860 is formed from a combination of dispersion of reflective aerosols through the nozzles 120 and dispersion of reflective aerosols generated in the exhaust from the engine(s) illustrated in FIG. 10. In another example, a blanket 860 can be formed from dispersion of reflective aerosols generated in the exhaust from the engine(s) illustrated in FIG. 10.

The nozzles 120 to disperse the reflective aerosol may be controlled, for example, by a controller 702 as shown in FIG. 8, whereby the controller actuates nozzles 720 corresponding to nozzles 120 of FIG. 10 to disperse the reflective aerosol. Optionally, the controller 702 may control when the reflective aerosols are added to the fuel for dispersion through the engine exhaust. The controller may be configured to determine when dispersion of the reflective aerosol is appropriate. For example, dispersion may not occur below a predetermined altitude and may not occur over certain geographic regions. A map database, such as a map database stored in memory 734, may be used to identify locations where dispersion of the reflective aerosols is acceptable or appropriate, and/or identify locations where dispersion of the reflective aerosols is undesirable. For example, dispersion of reflective aerosols may be precluded over solar farms where energy is generated from solar energy. The map database may optionally include a weather component whereby current or future weather can be factored into the areas where dispersion of reflective aerosols may be precluded. For example, if a prevailing wind blows from west to east, the dispersion of reflective aerosols may be precluded to the west of farmland as it may drift over the farmland. Embodiments can employ real-time satellite data to predict when and where reflective aerosols may be dispersed. Embodiments can further determine a type of reflective aerosol or other molecule to deploy based on the region, and a density with which the product is dispersed. Artificial intelligence can be employed to interpret the satellite data to establish these regions of deployment along with when, what kind of reflective aerosol, and what density/volume may be dispersed.

FIG. 14 illustrates an example embodiment of an aircraft 110 dispersing plumes of reflective aerosol to form a blanket 860 of reflective aerosol. As shown, sunlight from the sun 862 along path 864 is reflected, at least in part, from the blanket 860 of reflective aerosol along reflected path 866. According to example embodiments, the volume and density of the reflective aerosols dispersed by the aircraft 110 determine the proportion of sunlight that is reflected from the blanket 860 of reflective aerosol. A greater volume and/or density of reflective aerosol dispersed from the aircraft 110 results in a relatively higher degree of sunlight reflected from path 864 along path 866, while allowing less sunlight to penetrate the blanket 860. The controller 702 of an example embodiment controls the volume and/or density of the reflective aerosol dispersed from respective nozzles to control a degree of transparency of the respective plume of reflective aerosol suspended in air. The controller 702 of an example embodiment is configured to increase a proportion of light reflected from the plume of reflective aerosol based on at least one of a volume or a density of reflective aerosol dispersed.

FIGS. 15, 16, and 17 illustrate flowcharts of systems 700, methods, and apparatuses according to example embodiments of the present disclosure. It will be understood that each block of the flowcharts, and combinations of blocks in the flowcharts, may be implemented by various means, such as hardware, firmware, processor, circuitry, computing device, and/or other devices associated with execution of software including one or more computer program instructions. For example, one or more of the procedures described above may be embodied by computer program instructions. In this regard, the computer program instructions which embody the procedures described above may be stored by the memory 734 of a controller 702 of a system 700 employing an embodiment of the present disclosure and executed by the processing circuitry 732 of the system 700. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

As shown in FIG. 15, a method for displaying a message from an aircraft includes providing a fluid or gas to each of a plurality of valves as shown at 900. Each of the valves are controlled with a controller to produce a plume from a plurality of nozzles, where each nozzle is associated with a respective valve, and where the plurality of nozzles are distributed along a span of a wing of the aircraft as shown at 910. Indicia is caused to be displayed at 920 on the plurality of plumes from the plurality of nozzles. In an example, these plurality of plumes comprise reflective aerosols.

As shown in FIG. 16, a method for displaying a message from an aircraft includes providing a fluid or gas to each of a plurality of valves as shown at 1000. Each of the valves are controlled with a controller to produce cloud bursts from a plurality of nozzles, where each nozzle is associated with a respective valve, and where the plurality of nozzles are distributed along a span of a wing of the aircraft as shown at 1010. The one or more cloud bursts are produced to cooperate to form indicia suspended in an atmosphere trailing the aircraft as the aircraft advances through the atmosphere as shown at 1020. In an example, these one or more cloud bursts comprise reflective aerosols. For instance, in an example, cloud bursts 230 in FIG. 9 comprise reflective aerosols.

As shown in FIG. 17, a method for producing plumes of reflective aerosol is shown. At 1100, fuel is supplied to an engine of an aircraft for combustion in the engine. At 1110, an additive to the fuel is supplied, where the additive is a reflective aerosol or a precursor of a reflective aerosol. At 1120, the fuel and the additive to the fuel are combusted in the engine. At 1130, exhaust from the engine is generated including a plume of reflective aerosol, where the reflective aerosol reflects sunlight.

Accordingly, blocks of the flowcharts support combinations of means for performing the specified functions and combinations of operations for performing the specified functions for performing the specified functions of communicating a message from an aircraft. It will also be understood that one or more blocks of the flowcharts, and combinations of blocks in the flowcharts, can be implemented by special purpose hardware-based computer systems which perform the specified functions, or combinations of special purpose hardware and computer instructions. For example, one or more blocks of the flowcharts and combinations of blocks in the flowcharts can be performed by an apparatus for communicating a message from an aircraft including processing circuitry and at least one non-transitory memory including computer program code instructions. The computer program code instructions of an example embodiment are configured to, when executed, perform the specified functions and combinations of operations illustrated in the blocks of the flowcharts.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system for communicating a message from an aircraft comprising:
   a plurality of valves;
   at least one tank in fluid communication with each of the plurality of valves, wherein contents of the tank comprise at least one of a reflective aerosol or a precursor of a reflective aerosol;
   a plurality of nozzles, wherein each nozzle is associated with a corresponding valve, and wherein the plurality of nozzles are distributed along a span of a wing of the aircraft;
   a controller configured to control each of the plurality of valves wherein the controller is configured to actuate the plurality of valves to generate, from the contents of the tank received at each nozzle, a plume of reflective aerosol to be suspended in air to form a plurality of plumes of reflective aerosol; and
   a light source configured to project indicia on the plurality of plumes of reflective aerosol.

2. The system of claim 1, wherein the light source is attached to the aircraft and disposed at a different elevation with respect to the wing of the aircraft.

3. The system of claim 1, wherein the light source comprises a laser configured to project indicia from a raised elevation with respect to the wing of the aircraft on the plurality of plumes of reflective aerosol.

4. The system of claim 3, wherein the laser configured to project indicia comprises a laser configured to write indicia on the plurality of plumes with a refresh rate faster than a human eye can detect.

5. The system of claim 3, wherein the indicia comprises at least one of text, figures, symbols, or an image projected onto the plurality of plumes.

6. The system of claim 1, wherein the controller is configured to control a degree of transparency of the plume of reflective aerosol suspended in air.

7. The system of claim 6, wherein the controller is configured to increase a proportion of light reflected from the plume of reflective aerosol based on at least one of a volume or a density of reflective aerosol dispersed.

8. The system of claim 1, wherein the plurality of nozzles are distributed along a span of two wings of the aircraft, and are spaced such that the plurality of plumes of reflective aerosol generated from the plurality of nozzles combine for a width at least as wide as a wingspan of the span of the two wings of the aircraft.

9. The system of claim 1, further comprising an arm extending from the aircraft to a position above or below the aircraft, wherein the light source is disposed on the arm at a position either above or below the aircraft.

10. The system of claim 9, wherein the arm is movable between a stowed position proximate the aircraft and a deployed position in which the light source is disposed at an elevation different from that of the plurality of plumes.

11. The system of claim 10, wherein the controller is further configured to control movement of the arm between the stowed position and the deployed position.

12. A system comprising:
    a plurality of valves within an aircraft;
    at least one tank in fluid communication with the plurality of valves and containing at least one of a reflective aerosol or a precursor of a reflective aerosol;

a plurality of nozzles, wherein each nozzle is associated with a corresponding valve, and wherein the plurality of nozzles are distributed along a span of a wing of the aircraft; and a controller configured to control each of the plurality of valves, wherein the controller is configured to actuate the plurality of valves to generate, from the at least one of the reflective aerosol or the precursor of the reflective aerosol received at each nozzle, a cloud burst or plume to be suspended in air for formation of a plurality of cloud bursts or plumes of reflective aerosol that reflects sunlight.

13. The system of claim 12, wherein the controller is further configured to determine if a location of the aircraft corresponds to a location where reflective aerosol deployment is appropriate, and actuate the plurality of valves in response to the location of the aircraft corresponding to a location where reflective aerosol deployment is appropriate.

14. The system of claim 12, wherein the at least one tank comprises a tank held in a fuselage of the aircraft, wherein each of the plurality of valves are in fluid communication with the tank and the at least one of the reflective aerosol or the precursor of the reflective aerosol are provided from the tank to the plurality of valves.

15. The system of claim 12, wherein the at least one tank comprises a plurality of tanks held in the wing of the aircraft, wherein each of the plurality of valves are in fluid communication with a respective tank of the plurality of tanks and the at least one of the reflective aerosol or the precursor of the reflective aerosol are provided from the plurality of tanks to the plurality of valves.

16. The system of claim 12, further comprising:
a fuel system for supplying fuel to an engine of the aircraft, wherein the at least one tank is in fluid communication with the fuel system, wherein the controller is further configured to meter the at least one of the reflective aerosol or the precursor of the reflective aerosol into the fuel system to mix with the fuel supplied to the engine, wherein exhaust from the engine from combustion of the fuel mixed with the at least one of the reflective aerosol or the precursor of the reflective aerosol produces a plume of reflective aerosol, and wherein the reflective aerosol reflects sunlight.

17. The system of claim 16, wherein in response to the formation of the plurality of cloud bursts or plumes from the plurality of nozzles and the exhaust from the engine of the plume of reflective aerosol, a blanket is formed of reflective aerosol that reflects sunlight.

18. A method comprising:
supplying fuel to an engine of an aircraft for combustion in the engine of the aircraft;

supplying an additive to the fuel, wherein the additive comprises at least one of a reflective aerosol or a precursor of a reflective aerosol;

combusting the fuel and the additive to the fuel in the engine; and generating, in exhaust from the engine, a plume of reflective aerosol, wherein the reflective aerosol reflects sunlight.

19. The method of claim 18, wherein supplying the additive to the fuel comprises supplying the additive to the fuel from a tank, wherein the tank comprises the at least one of the reflective aerosol or the precursor of the reflective aerosol.

20. The method of claim 18, wherein supplying the additive to the fuel comprises pre-mixing the additive to the fuel before the fuel reaches the engine of the aircraft.

* * * * *